(12) United States Patent
Patel et al.

(10) Patent No.: US 11,429,573 B2
(45) Date of Patent: Aug. 30, 2022

(54) DATA DEDUPLICATION SYSTEM

(71) Applicant: Dell Products L.P., Round Rock, TX (US)

(72) Inventors: Dharmesh M. Patel, Round Rock, TX (US); Ravikanth Chaganti, Karnataka (IN); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 16/654,995

(22) Filed: Oct. 16, 2019

(65) Prior Publication Data

US 2021/0117393 A1 Apr. 22, 2021

(51) Int. Cl.
*G06F 16/215* (2019.01)

(52) U.S. Cl.
CPC .................. *G06F 16/215* (2019.01)

(58) Field of Classification Search
USPC ........................................................ 707/692
See application file for complete search history.

(56) References Cited

U.S. PATENT DOCUMENTS

| | | | | |
|---|---|---|---|---|
| 5,727,197 | A * | 3/1998 | Burgess | G06F 16/284 |
| 8,645,334 | B2 * | 2/2014 | Leppard | G06F 16/1748 |
| | | | | 707/692 |
| 8,682,873 | B2 * | 3/2014 | Aronovich | G06F 16/1748 |
| | | | | 707/696 |
| 8,712,974 | B2 | 4/2014 | Datuashvili et al. | |
| 8,751,763 | B1 * | 6/2014 | Ramarao | G06F 16/1752 |
| | | | | 711/162 |
| 9,921,773 | B2 * | 3/2018 | Georgiev | G06F 3/0641 |
| 9,983,821 | B2 * | 5/2018 | Sala | G06F 3/0641 |
| 10,061,535 | B2 * | 8/2018 | Prahlad | G06F 3/0638 |
| 10,176,189 | B2 * | 1/2019 | Berrington | G06F 16/128 |
| 10,255,287 | B2 * | 4/2019 | Sarab | G06F 16/1748 |
| 10,585,611 | B2 * | 3/2020 | Sharma | G06F 3/0605 |
| 10,795,860 | B1 * | 10/2020 | Wallace | G06F 3/0641 |
| 2004/0085999 | A1 * | 5/2004 | Burnett | H04L 1/24 |
| | | | | 370/474 |
| 2010/0332401 | A1 * | 12/2010 | Prahlad | H04L 63/0428 |
| | | | | 705/80 |
| 2011/0206055 | A1 | 8/2011 | Leong | |
| 2011/0276781 | A1 * | 11/2011 | Sengupta | G06F 16/137 |
| | | | | 711/216 |

(Continued)

*Primary Examiner* — Cam Linh T Nguyen
(74) *Attorney, Agent, or Firm* — Joseph Mencher

(57) ABSTRACT

A data deduplication system includes a data deduplication subsystem coupled to each of a host system and a storage system. The data deduplication system receives data from the host system, generates a data deduplication identifier for the data, and determines whether the data deduplication identifier for the data is stored in a data deduplication database. In response to determining that the data deduplication identifier is not stored in the data deduplication database, the data deduplication system stores the data deduplication identifier for the data in the data deduplication database in association with a data counter for the data, and transmits the data to the storage system for storage. In response to determining that the data deduplication identifier is stored in the data deduplication database, the data deduplication system increments a data counter that is associated with the data deduplication identifier in the data deduplication database, and discards the data.

20 Claims, 33 Drawing Sheets

(56) References Cited

U.S. PATENT DOCUMENTS

| | | | |
|---|---|---|---|
| 2012/0117028 A1* | 5/2012 | Gold | G06F 11/1458 |
| | | | 707/640 |
| 2012/0257627 A1* | 10/2012 | Nguyen | H04L 49/208 |
| | | | 370/392 |
| 2015/0058302 A1* | 2/2015 | Abney, III | G06F 16/2365 |
| | | | 707/692 |
| 2016/0050146 A1* | 2/2016 | Henderson | H04L 67/1097 |
| | | | 370/392 |
| 2017/0249327 A1* | 8/2017 | Gowdappa | G06F 16/166 |
| 2018/0143780 A1* | 5/2018 | Cho | G06F 3/0688 |
| 2018/0150256 A1* | 5/2018 | Kumar | G06F 3/0611 |
| 2020/0034451 A1* | 1/2020 | Danilov | G06F 3/067 |
| 2020/0057752 A1* | 2/2020 | Tofano | G06F 16/215 |

* cited by examiner

DATA DEDUPLICATION SYSTEM

BACKGROUND

The present disclosure relates generally to information handling systems, and more particularly to performing data deduplication operations for data stored in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, host systems coupled to storage systems, sometimes perform data deduplication operations in order to provide for more efficient utilization of the storage resources provided by the storage system. Conventional data deduplication systems operate to perform data deduplication operations at the source of the data (e.g., the host system discussed above). For example, a deduplication agent operating on the host system (which provides an application host or Virtual Machine (VM) that generates and transmits the data for storage) may perform data deduplication operations as part of data backup operations it conducts to backup application data, which reduces the amount of data the host system will transmit over a network to the storage system, but operates to introduce compute/processing overhead for the host system/application host/VM due to the compute/processing operations that must be performed in order to carry out the data deduplication operations discussed above (e.g., which occur while also performing relatively compute/processing intensive data backup operations.)

One solution to the issues associated with the source-based data deduplication operations discussed above provides for target-based data deduplication operations that are performed by the storage system. As described in further detail below, such target-based data deduplication operations may be performed by a backup appliance operating on the storage system as it receives data for storage, or as it performs post-processing operations to move data from a primary storage subsystem to a backup storage subsystem or archive storage subsystem. Those target-based data deduplication operations operate to reduce the compute/processing overhead on the host system/application host/VM discussed above by removing the need for the host system/application host/VM to perform data deduplication operations. However, such target-based data deduplication operations provide for the transmission of data over the network to the storage system without performing data deduplication operations, thus using up network bandwidth for data that may be redundant and thus discarded by the backup appliance in the storage system during data deduplication operations.

Accordingly, it would be desirable to provide a data deduplication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a data deduplication engine that is configured to: receive data via a network from a host system; generate a data deduplication identifier for the data; determine whether the data deduplication identifier for the data is stored in a data deduplication database; in response to determining that the data deduplication identifier for the data is not stored in the data deduplication database: store the data deduplication identifier for the data in the data deduplication database in association with a data counter for the data; and transmit the data via the network to a storage system for storage; and in response to determining that the data deduplication identifier for the data is stored in the data deduplication database: increment a data counter that is associated with the data deduplication identifier for the data in the data deduplication database; and discard the data.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
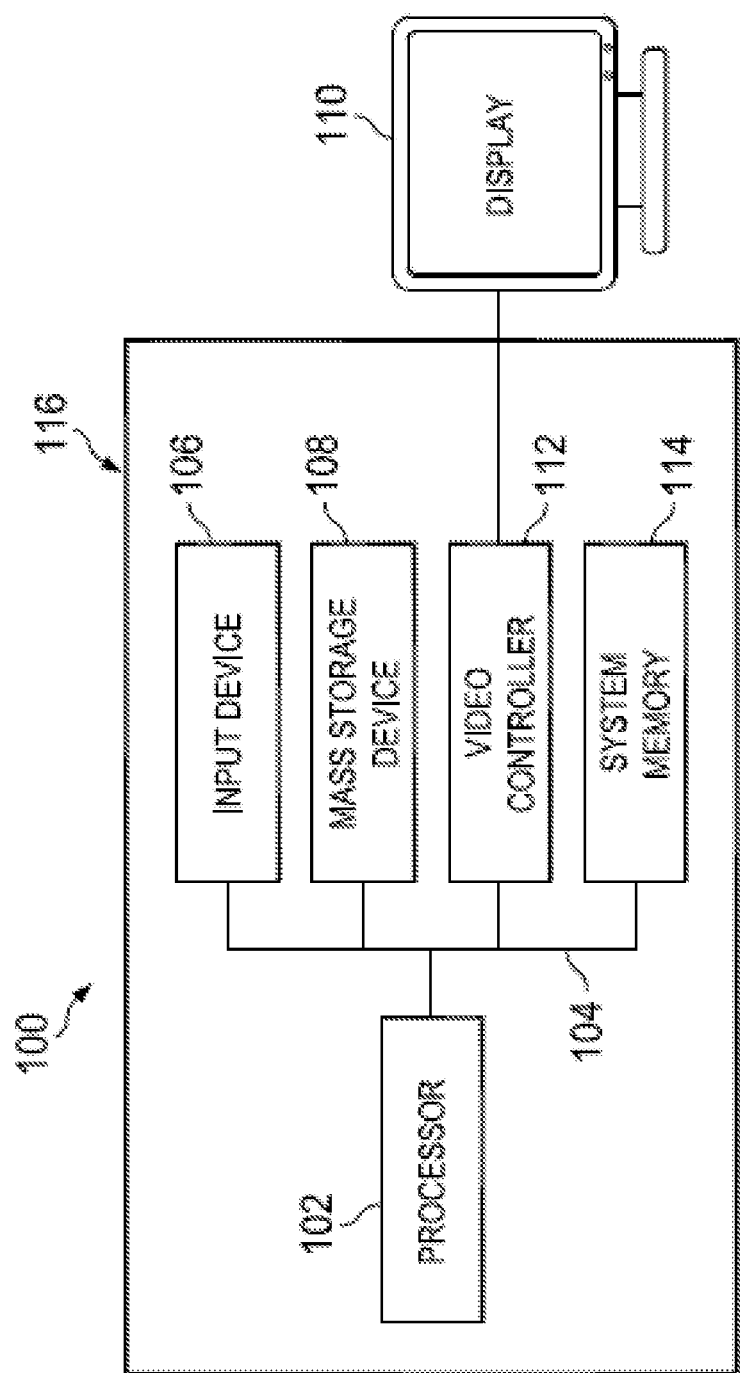
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
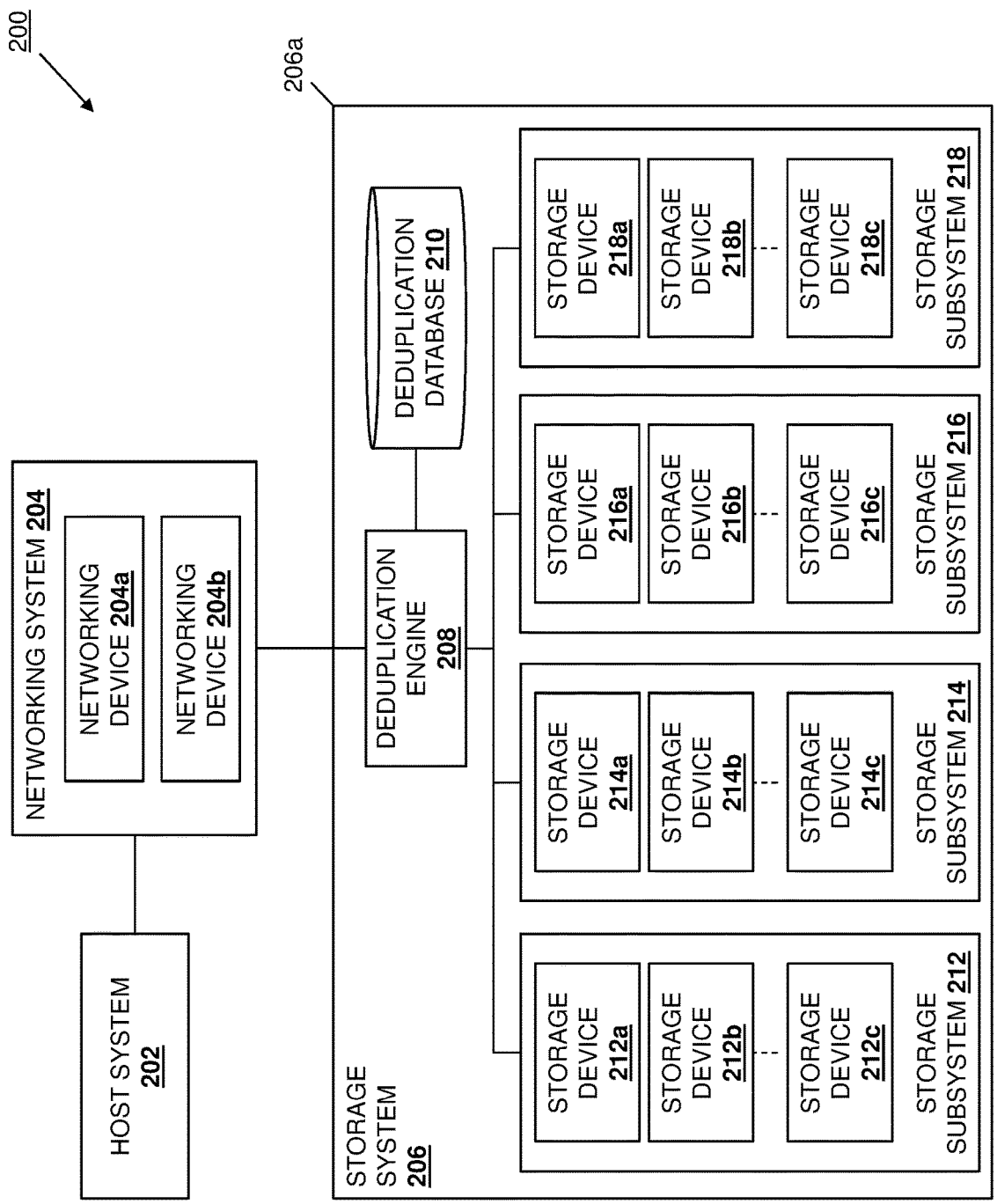
FIG. 2 is a schematic view illustrating an embodiment of a data deduplication system.

Referring now to FIG. 2, an embodiment of a data deduplication system 200 is illustrated. As discussed above and in further detail below, the data deduplication system 200 may provide for target-based data deduplication operations that are performed by the storage system in order to address issues associated with source-based data deduplication operations. As such, the discussion of the data deduplication system 200 is provided below to summarize such target-based data deduplication operations for comparison in the discussion of the networking-level-based deduplication operations below. In the illustrated embodiment, the data deduplication system 200 incudes a host system 202. In an embodiment, the host system 202 may be provided by the IHS 100 discussed above with reference to FIG. 1, and/or may include some or all of the components of the IHS 100, and in specific examples may include server devices, virtual machines, desktop computing devices, laptop/notebook computing devices, tablet computing devices, mobile phones, and/or other host devices that would be apparent to one of skill in the art in possession of the present disclosure. However, while illustrated and discussed as a single host device, one of skill in the art in possession of the present disclosure will recognize that many more host device(s) may be provided in the host system 200 and may include any devices that may be configured to operate similarly as discussed below.

In the illustrated embodiment, the host system 202 is coupled to a networking system 204 that may be provided by the IHS 100 discussed above with reference to FIG. 1, and/or may include some or all of the components of the IHS 100. In the illustrated embodiment, the networking system 204 includes a pair of networking devices 204 and 204b such as, for example, network switch devices. However, while illustrated and discussed as a being provided by a pair of network switch devices, one of skill in the art in possession of the present disclosure will recognize that the networking system 204 may include any devices that may be configured to operate similarly as the networking device(s) 204a and 204b discussed below. In the illustrated embodiment, the networking system 204 is coupled to a storage system 206 that may be provided by the IHS 100 discussed above with reference to FIG. 1, and/or may include some or all of the components of the IHS 100. In a specific example, the storage system 206 may be provided by a Software-Defined Storage (SDS) system, a Hyper-Converged Infrastructure (HCI) system (e.g., an HCI cluster), a Storage Area Network/Network Attached Storage (SAN/NAS) system, and/or a variety of other storage systems that one of skill in the art in possession of the present disclosure will recognize may operate similarly as discussed below. As will be appreciated by one of skill in the art in possession of the present disclosure, the storage system 206 may provide a primary storage system for the host system 202 (e.g., as opposed to backup storage system, an archive storage system, and/or other storage systems known in the art), with deduplication operations performed for data being stored in the primary storage system. However, one of skill in the art in possession of the present disclosure will recognize that the deduplication operations may be performed on other storage systems (e.g., the backup storage system and/or archive storage system discussed below) while remaining within the scope of the present disclosure as well.

In the illustrated embodiment, the storage system 206 includes a chassis 206a that houses the components of the storage system 206, only some of which are illustrated below. For example, the chassis 206a may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a deduplication engine 208 that is configured to perform the functionality of the deduplication engines and/or storage systems discussed below. In a specific example, the deduplication engine 208 may be provided by a storage system appliance that is included in the SDS system, HCI system, or other storage system, although other deduplication processing systems will fall within the scope of the present disclosure as well.

The chassis 206a may also house a database storage device (not illustrated, but which may include the storage 108 discussed above with reference to FIG. 1) that is coupled to the deduplication engine 208 (e.g., via a coupling between the storage system and the processing system) and that includes a deduplication database 210 that is configured to store any of the information utilized by the deduplication engine 208 discussed below. For example, the deduplication database 210 may be provided by a storage system appliance that is included in the SDS system, HCI system, or other storage system, although other deduplication storage systems will fall within the scope of the present disclosure as well. In a specific example, the deduplication database 210 may be "carved out" or otherwise provided by storage that is available in the storage system 206 (e.g., Software-Defined Storage (SDS) available in the storage system 206), often in a redundant manner (e.g., providing redundant deduplication databases for use in the event of a storage device failure.) Furthermore, the deduplication functionality (e.g., the deduplication engine 208 and deduplication database 210) in the primary storage provided by the storage system 206 may instead be provided in a backup storage or archival storage while remaining within the scope of the present disclosure as well The chassis 206 may also house a plurality of storage subsystems such as, for example, the storage subsystems 212, 214, 216, and 218 illustrated in FIG. 2, each of which may be coupled to the networking system 204. For example, the networking devices 204a and 204b in the networking system 204 may be redundantly configured to provide high availability of networking ports for the storage subsystems 212, 214, 216, and 218, which allows writes from the host system 202 via the networking system 204 to be transmitted by either of the networking devices 204a and 204b in a non-coupled manner with no fixed assignments between networking devices and storage subsystems, although coupled/fixed assignments between networking devices and storage subsystems (e.g., in which a dedicated networking device is used to transmit data to a particular storage subsystem unless there is a failure that requires the use of the other networking device) will fall within the scope of the present disclosure as well. However, one of skill in the art in possession of the present disclosure will recognize that other storage subsystem/networking system coupling configurations will fall within the scope of the present disclosure as well. Furthermore, while four storage subsystems are provided in the storage system 206 in the illustrated embodiment, one of skill in the art in possession of the present disclosure will recognize that storage systems with fewer or more storage subsystems will fall within the scope of the present disclosure as well.

Continuing with the examples provided above, the storage subsystems 212-218 may be provided by SDS node devices in an SDS system, HCI node devices in an HCI cluster/system, and/or any other storage subsystems that would be apparent to one of skill in the art in possession of the present disclosure. In the illustrated example, each of the storage subsystems includes a plurality of storage devices, with the storage subsystem 212 including a plurality of storage devices 212a, 212b, and up to 212c; the storage subsystem 214 including a plurality of storage devices 214a, 214b, and up to 214c; the storage subsystem 216 including a plurality of storage devices 216a, 216b, and up to 216c; and the storage subsystem 218 including a plurality of storage devices 218a, 218b, and up to 218c. In an embodiment, the storage devices 212a-c, 214a-c, 216a-c, and 218a-c may be provided by Solid State Drives (SSDs) such as Non-Volatile Memory express (NVMe) SSDs, Hard Disk Drives (HDDs), and/or any other storage devices that would be apparent to one of skill in the art in possession of the present disclosure. While a single data deduplication system 200 is illustrated, one of skill in the art in possession of the present disclosure will recognize that more data deduplication systems may be provided while remaining within the scope of the present disclosure. Furthermore, while a specific data deduplication system 200 has been illustrated and described, one of skill in the art in possession of the present disclosure will recognize that the data deduplication system of 200 may include a variety of components and component configurations while remaining within the scope of the present disclosure as well.

Figure 3A:
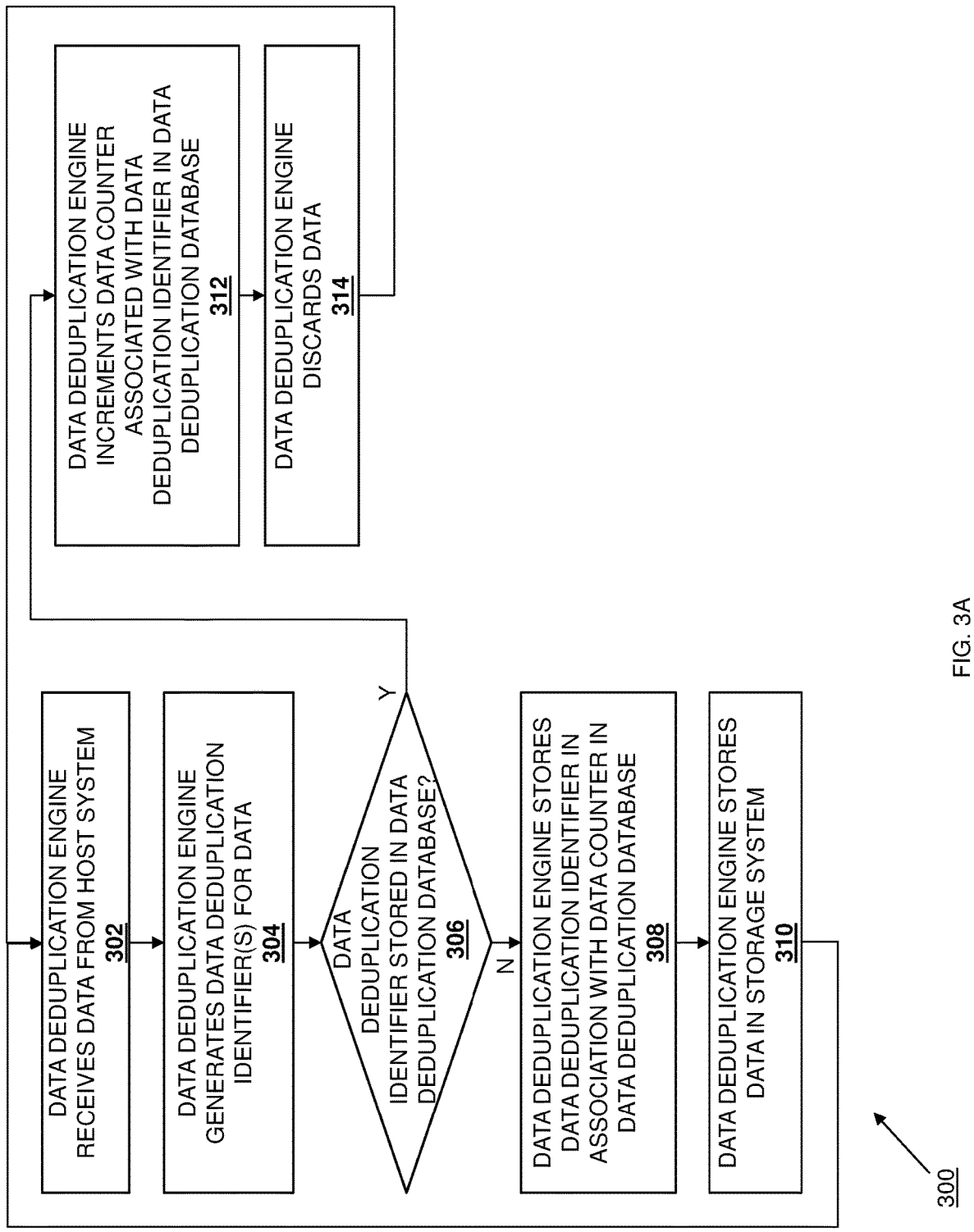
FIG. 3A is a flow chart illustrating an embodiment of a method for performing data deduplication operations using the data deduplication system of FIG. 2.
Figure 4A:
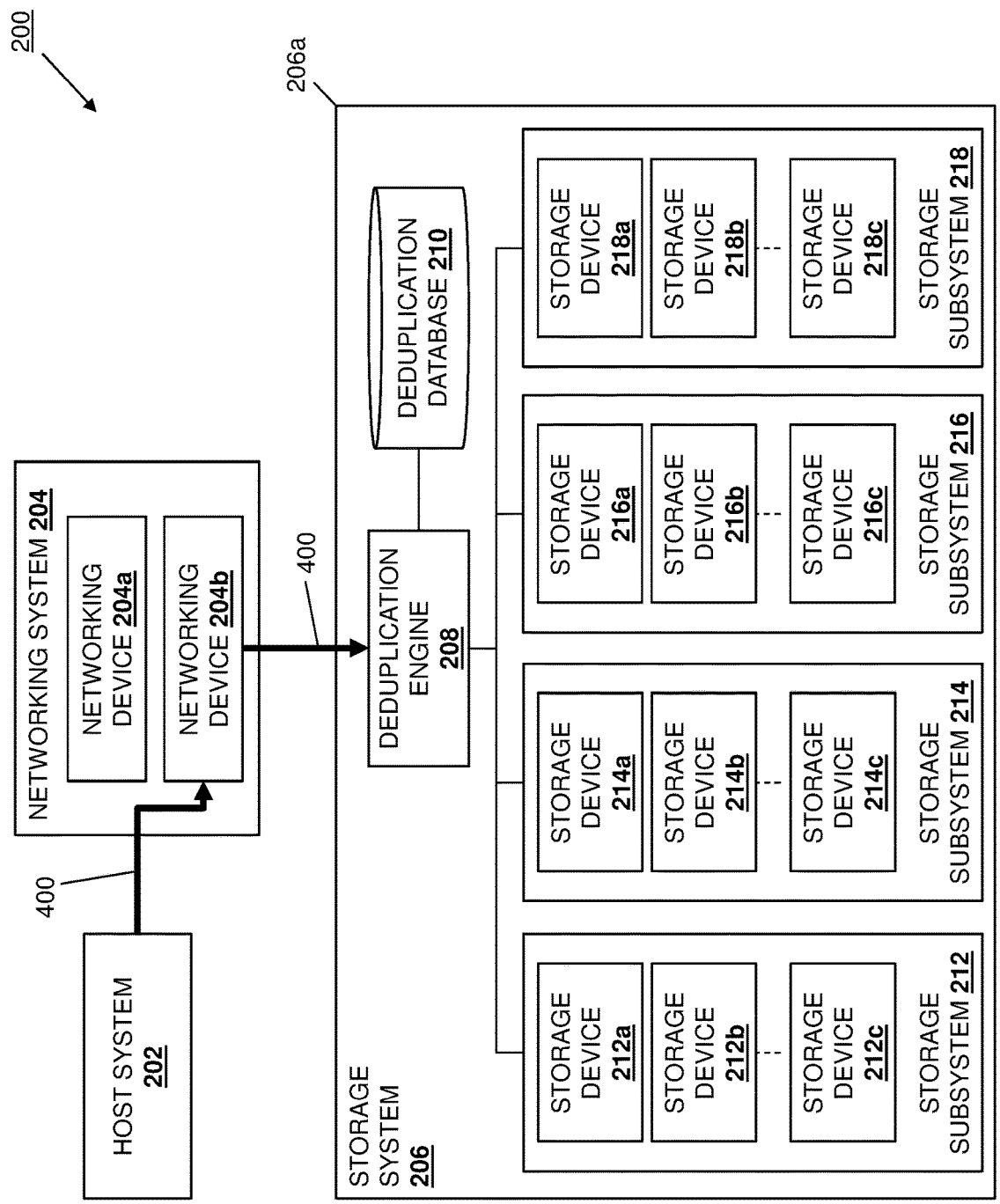
FIG. 4A is a schematic view illustrating an embodiment of the data deduplication system of FIG. 2 operating during the method of FIG. 3.

Referring now to FIG. 3A, an embodiment of a method 300 for performing data deduplication operations using the data deduplication system 200 is illustrated. As discussed above and in further detail below, the method 300 provides a target-based data deduplication method that is briefly summarized below for discussion of the networking-level-based data deduplication method of the present disclosure. The method 300 begins at block 302 where a data deduplication engine receives data from a host system. With reference to FIG. 4A, in an embodiment of block 302, the host system 202 (e.g., an application host, VM, etc.) may generate and transmit data 400 such that the data is received by the networking device 204*b* in the networking system 204 and forwarded by that networking device 204*b* to the deduplication engine 208 in the storage subsystem 206. Continuing with the specific examples provided above, the application host or VM included in the host system 202 may write an object (e.g., in a data packet) to the SDS system or HCI system providing the storage system 206 (e.g., a primary storage system) such that the object is received by a data handling subsystem that provides the deduplication engine 208 and that is configured to perform the deduplication operations discussed below as part of its data storage functions.

Figure 4B:
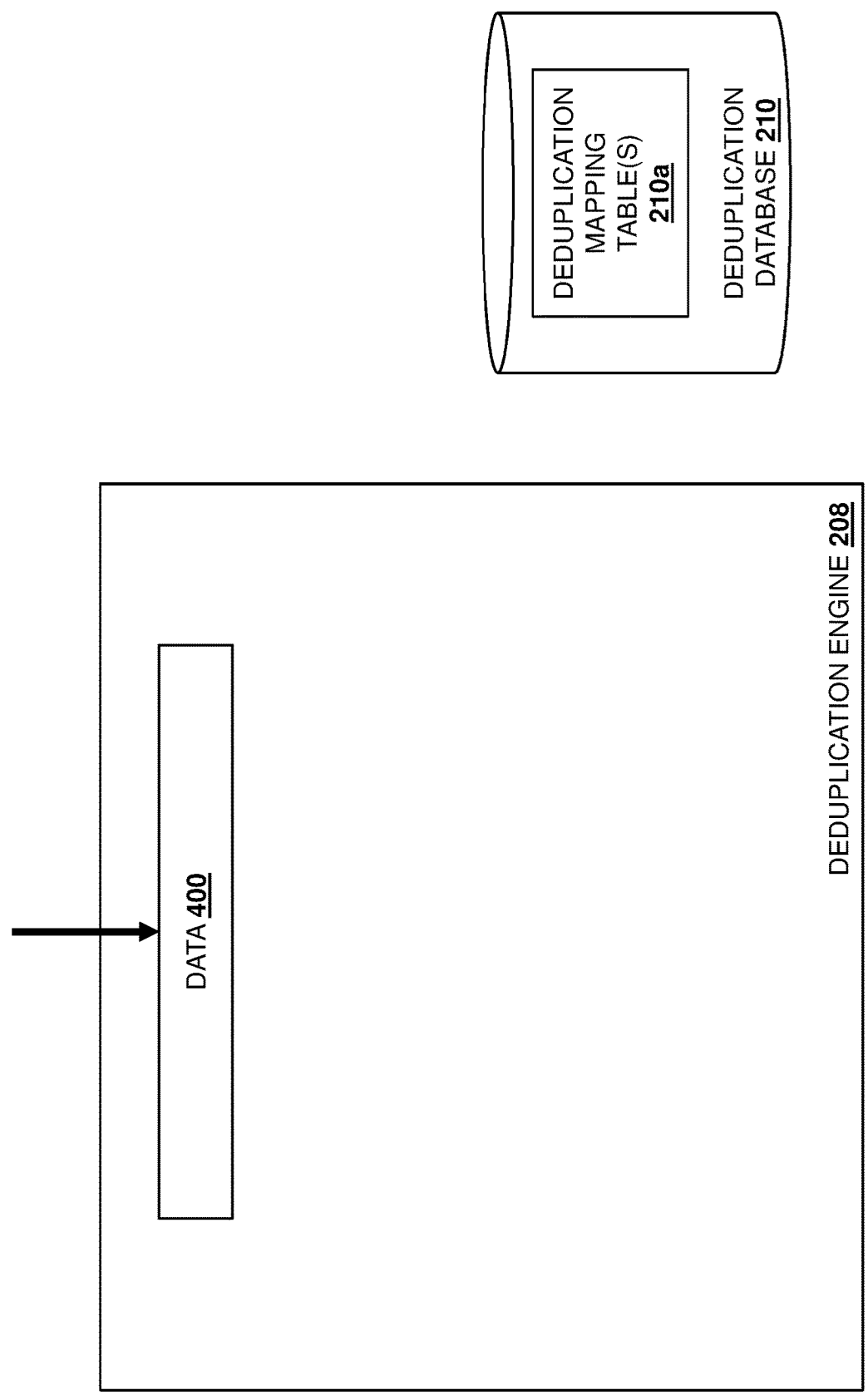
FIG. 4B is a schematic view illustrating an embodiment of the data deduplication system of FIG. 2 operating during the method of FIG. 3.
Figure 4C:
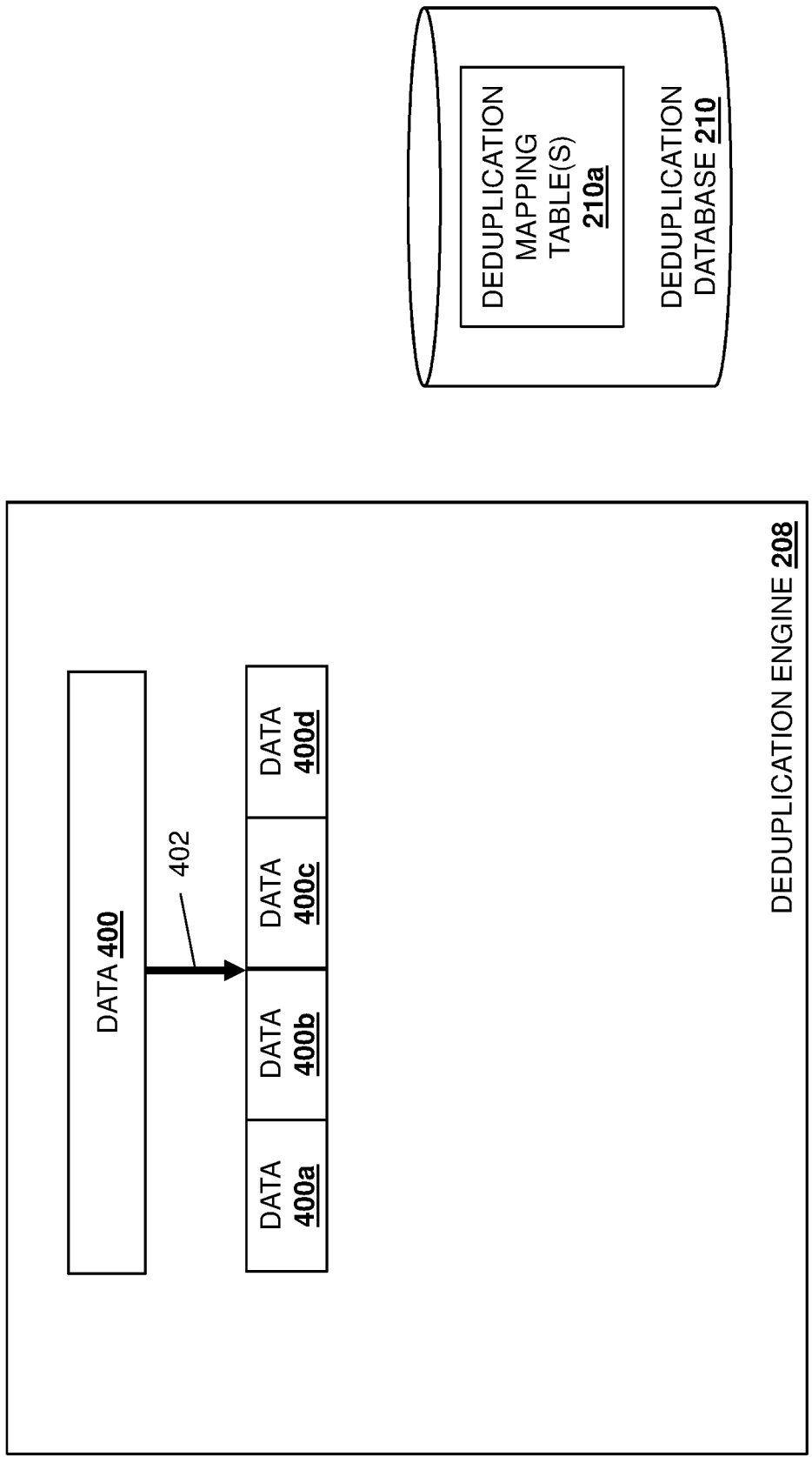
FIG. 4C is a schematic view illustrating an embodiment of the data deduplication system of FIG. 2 operating during the method of FIG. 3.
Figure 4D:
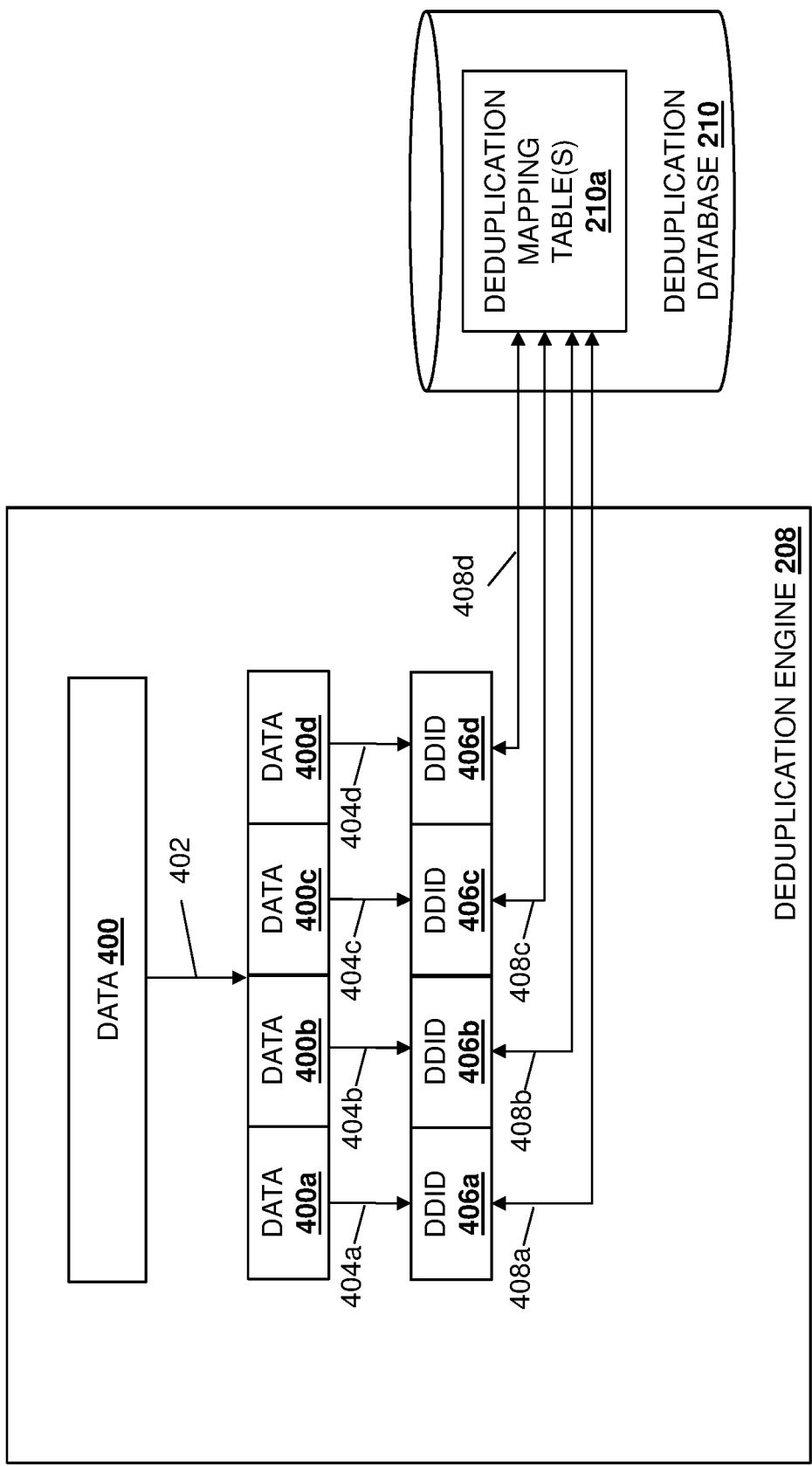
FIG. 4D is a schematic view illustrating an embodiment of the data deduplication system of FIG. 2 operating during the method of FIG. 3.

The method 300 then proceeds to block 304 where the data deduplication engine generates data deduplication identifiers for the data. With reference to FIGS. 4B, 4C, and 4D, in an embodiment of block 304, the deduplication engine 208 may receive the data 400 and perform data chunking operations 402 to generate data chunks 400*a*, 400*b*, 400*c*, and 400*d*, and then may perform respective hashing operations 404*a*, 404*b*, 404*c*, and 404*d* on the data chunks 400*a*, 400*b*, 400*c*, and 400*d* in order to generate respective data deduplication identifiers 406*a*, 406*b*, 406*c*, and 406*d*. As will be appreciated by one of skill in the art in possession of the present disclosure, the hashing operations 404*a*-404*d* performed on the data chunks 400*a*-400*d* operate to map each data chunk (which may have arbitrary size) to its associated data deduplication identifier that is unique for that data chunk in the data deduplication system 200, and that may have a fixed size. However, while hashing operations are discussed herein, one of skill in the art in possession of the present disclosure will recognize that other operations may be utilized to generate the data deduplication identifiers discussed above while remaining within the scope of the present disclosure as well.

The method 300 then proceeds to decision block 306 where it is determined whether a data deduplication identifier is stored in a data deduplication database. With reference to FIG. 4D, in an embodiment of decision block 306, the data deduplication engine 208 may perform respective checking operations 408*a*, 408*b*, 408*c*, and 408*d* to check whether the data deduplication identifiers 406*a*-406*d* generated at block 304 are already stored in deduplication mapping table(s) 210*a* in the deduplication database 210. As discussed below, any "new" data received from the host system 202 (e.g., data that is not duplicative of data that is currently stored in the storage system 206) may have its data deduplication identifier generated and stored in the data deduplication database 210 as part of its storage in the storage system 206 and, as such, at decision block 306, the data deduplication engine 208 may compare each data deduplication identifier 406*a*-406*d* generated at block 304 with the data deduplication identifiers stored in the deduplication mapping table(s) 210*a* in the deduplication database 210 to determine whether the data chunks 400*a*-400*d* are "new" data or "duplicative" data that was previously received from the host system 202 (e.g., data that is duplicative of data that is currently stored in the storage system 206.) As will be appreciated by one of skill in the art in possession of the present disclosure, the host system 202 may be provided by multiple host systems, each which may include multiple host devices, and host systems/host devices may differ in type. As such, multiple host systems/devices may write data to the storage system 206 and any of that data may be deduplicated as described herein.

Figure 4E:
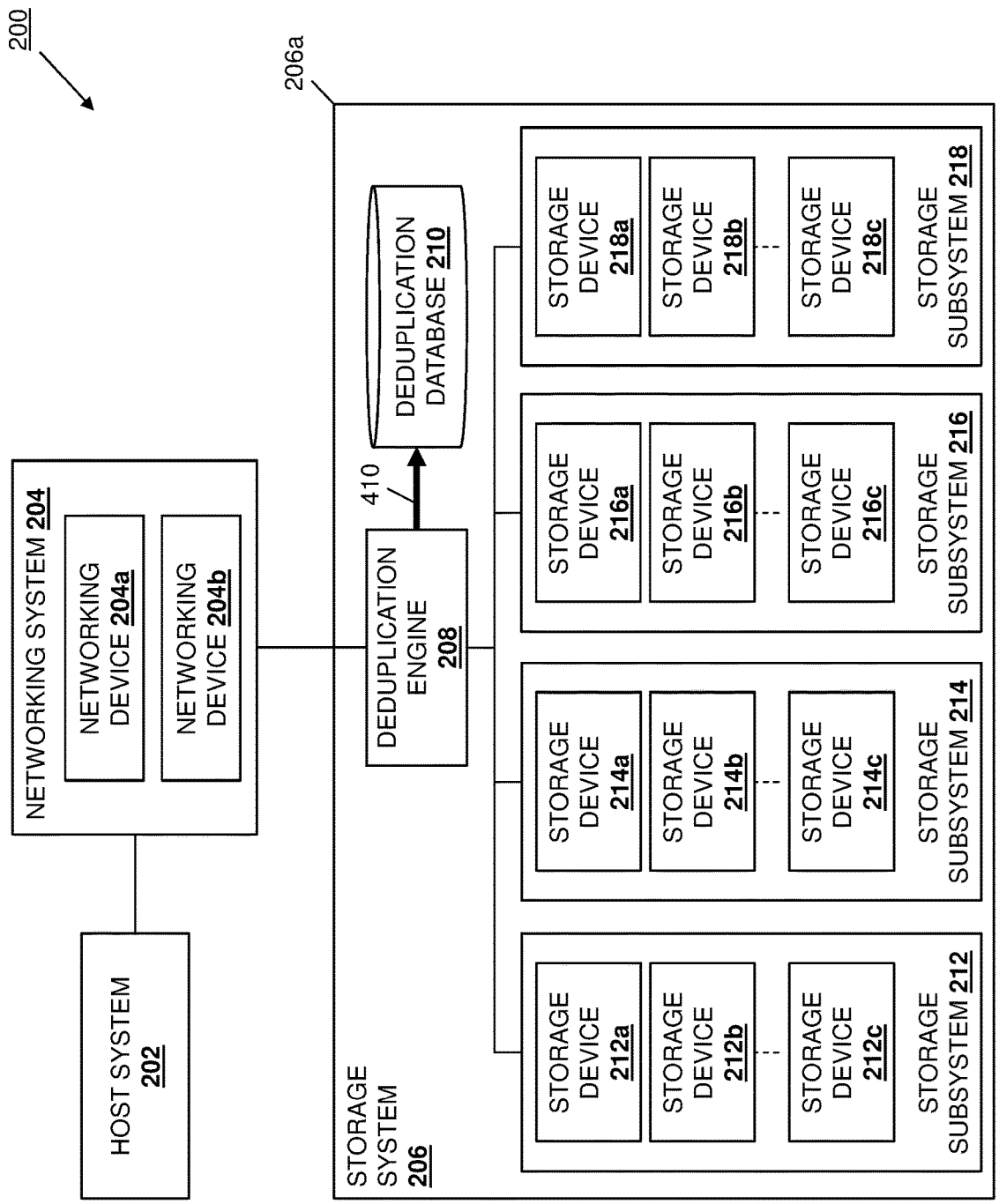
FIG. 4E is a schematic view illustrating an embodiment of the data deduplication system of FIG. 2 operating during the method of FIG. 3.
Figure 4F:
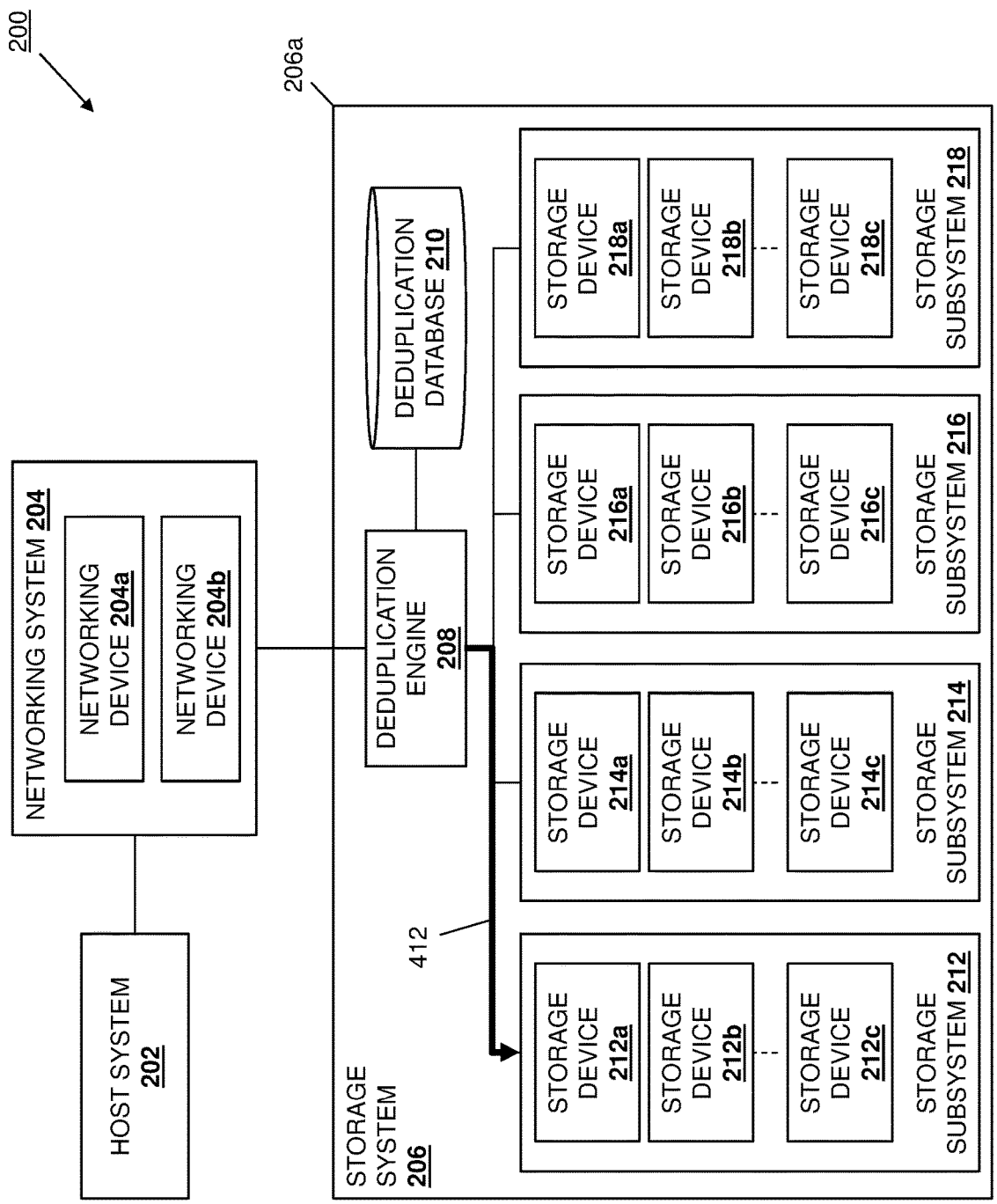
FIG. 4F is a schematic view illustrating an embodiment of the data deduplication system of FIG. 2 operating during the method of FIG. 3.

If, at decision block 306, it is determined that the data deduplication identifier is not stored in the data deduplication database, the method 300 proceeds to block 308 where the data deduplication engine stores the data deduplication identifier in association with a data counter in the data deduplication database. With reference to FIG. 4E, in an embodiment of block 308 and following a determination at decision block 306 that a data deduplication identifier generated for a respective data chunk is not stored in the deduplication mapping table(s) 210*a* in the deduplication database 210, the data deduplication engine 208 may perform data deduplication identifier storage operations 410 to store the data deduplication identifier generated for that respective data chunk in the deduplication mapping table(s) 210*a* in the deduplication database 210. Furthermore, any data deduplication identifier stored in the deduplication mapping table(s) 210*a* in the data deduplication database 210 may be stored as part of a data deduplication identifier/data counter tuple for its associated data that includes that data deduplication identifier for that data and a data counter for that data, discussed in further detail below. The method 300 then proceeds to block 310 where the data deduplication engine stores the data in a storage system. With reference to FIG. 4F, in an embodiment of block 310, the data deduplication engine 208 may then perform data storage operations 412 to store the data 400 that was received at block 302 in a storage device in one of the storage subsystems 212-218 in the storage system 206.

Figure 4G:
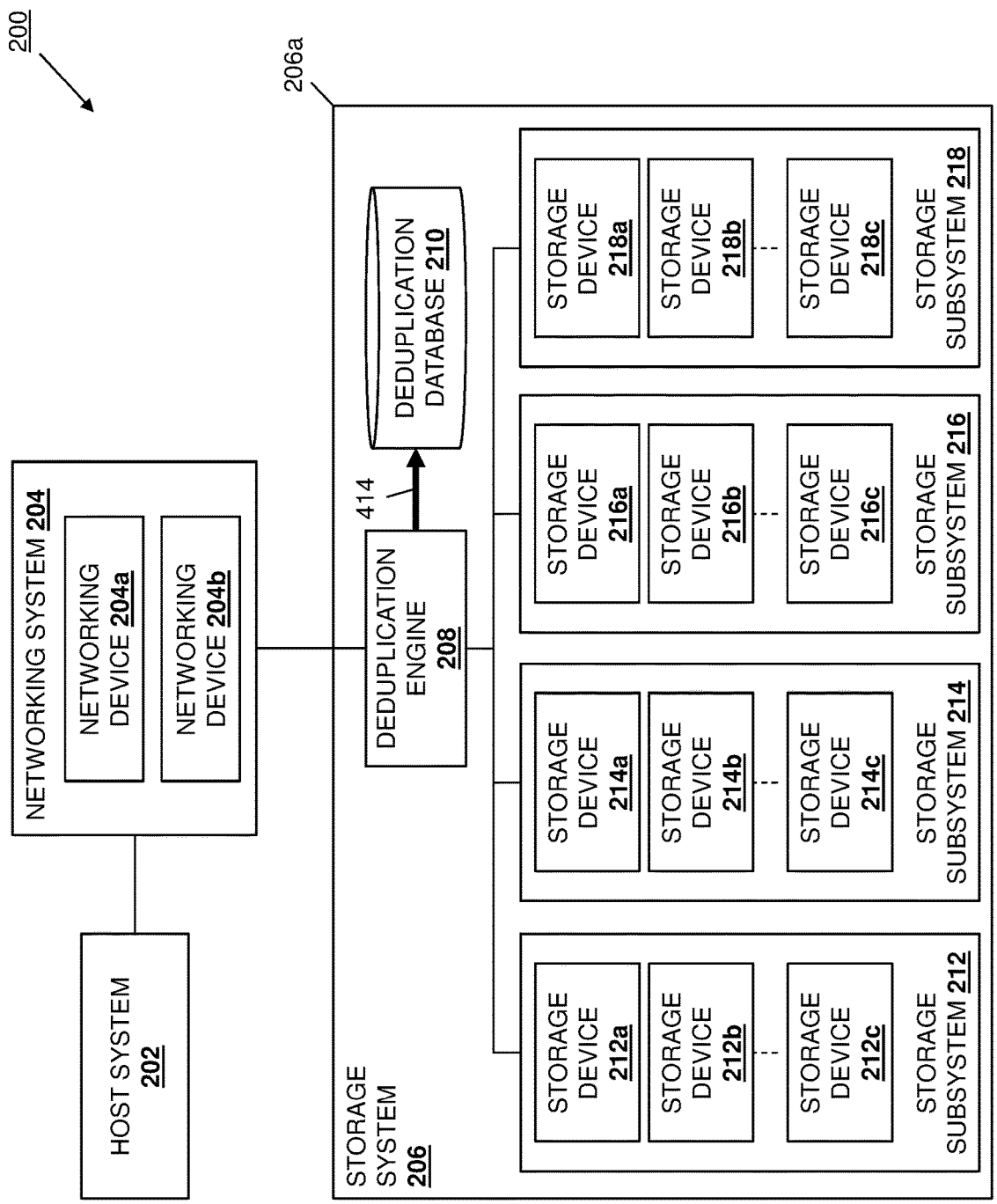
FIG. 4G is a schematic view illustrating an embodiment of the data deduplication system of FIG. 2 operating during the method of FIG. 3.

If at decision block 306, it is determined that the data deduplication identifier is stored in the data deduplication database, the method 300 proceeds to block 312 where the data deduplication engine increments a data counter associated with the data deduplication identifier in the data deduplication database. With reference to FIG. 4G, in an embodiment of block 312 and following a determination at decision block 306 that a data deduplication identifier generated for a respective data chunk is stored in the deduplication mapping table(s) 210*a* in the deduplication database 210, the data deduplication engine 208 may perform data counter incrementing operations 414 to increment the data counter associated with that respective data chunk in the deduplication mapping table(s) 210*a* in the deduplication database 210. As discussed above, any data deduplication identifier stored in the deduplication mapping table(s) 210*a* in the data deduplication database 210 may be stored as part of a data deduplication identifier/data counter tuple for its associated data that includes that data deduplication identifier for that data and a data counter for that data, and any time "duplicative" data is received, the data counter associated with that data may be incremented. As will be appreciated by one of skill in the art in possession of the present disclosure, the incrementing of the data counter for data that is already stored in the storage system 206 when "duplicative" data for that data is received provides a count of the number of host devices in the host system 202 that have provided that data for storage in the storage system 206, and thus the number of host devices in the host system 202 that may wish to retrieve that data. As such, as discussed further below, data may be kept stored in the storage system 206 as long as the data counter associated with that data is not at zero.

Figure 4H:
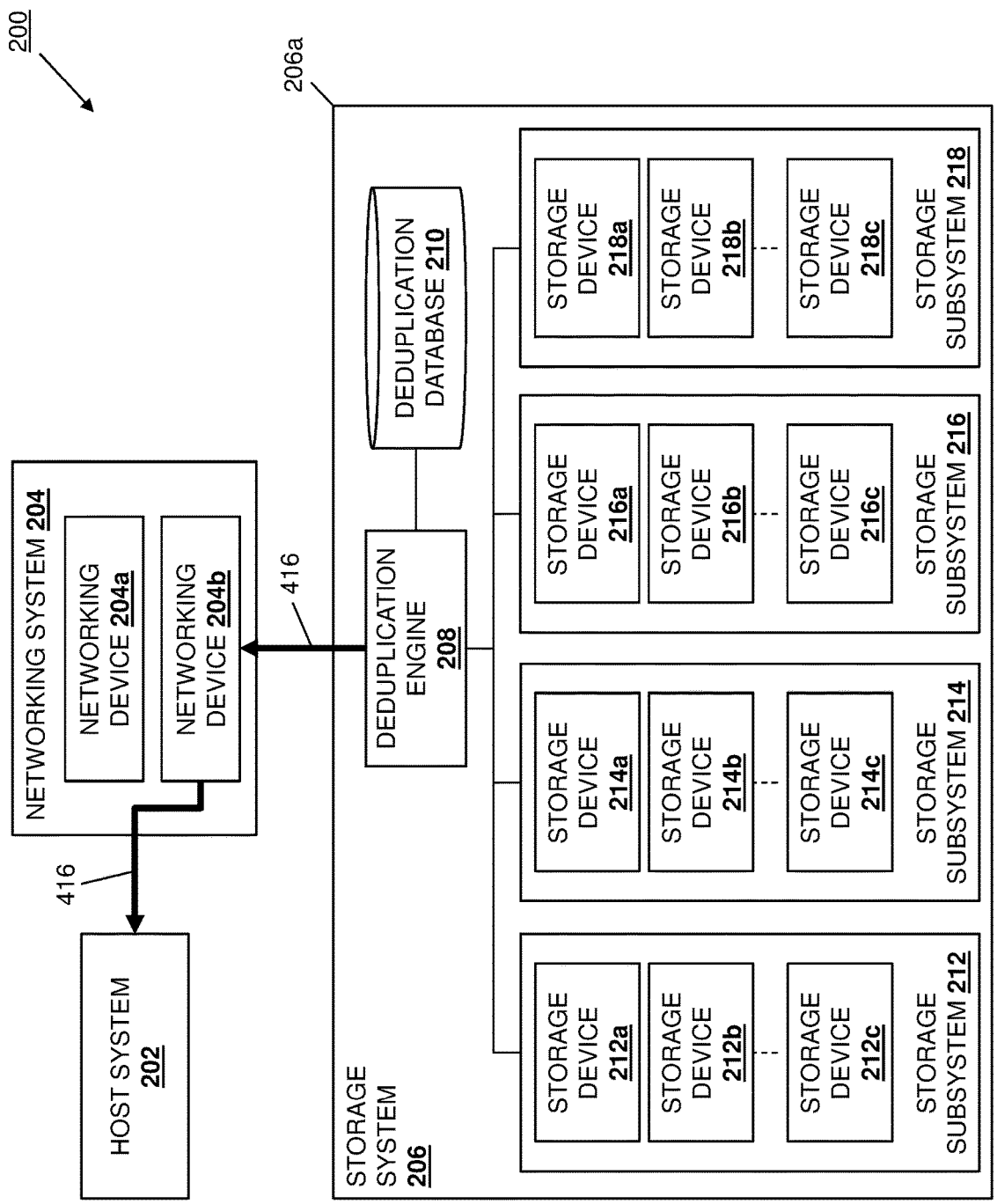
FIG. 4H is a schematic view illustrating an embodiment of the data deduplication system of FIG. 2 operating during the method of FIG. 3.

The method 300 then proceeds to block 314 where the data deduplication engine discards the data. In an embodiment, at block 314, the data deduplication engine 208 may then discard the data 400 (i.e., as the data deduplication engine 208 has determined that a copy of that data is already stored in the storage system 206.) With reference to FIG. 4H, following the storage of the data in the storage system 206 at block 310 or the discarding of the data at block 314, the data deduplication engine 208 may operate to generate and transmit an acknowledgement 416 to the networking device 204b, which forwards that acknowledgement 416 to the host system 202. As such, the application host or Virtual Machine (VM) in the host system 202 may receive the acknowledgement 416 that confirms that the data 400 is stored in the storage system 206. Following either of block 310 or block 314, the method 300 may return to block 302 and loop back through the block 302, 304, 306, 308, 310, 312, and 314 to receive data, generate a data deduplication identifier for that data, determine whether that data deduplication identifier is stored in a data deduplication database, store the data in a storage system and the data deduplication identifier in association with a data counter in the data deduplication database if so, and discard the data and increment the data counter associated with the data deduplication identifier in the data deduplication database if not.

Figure 3B:
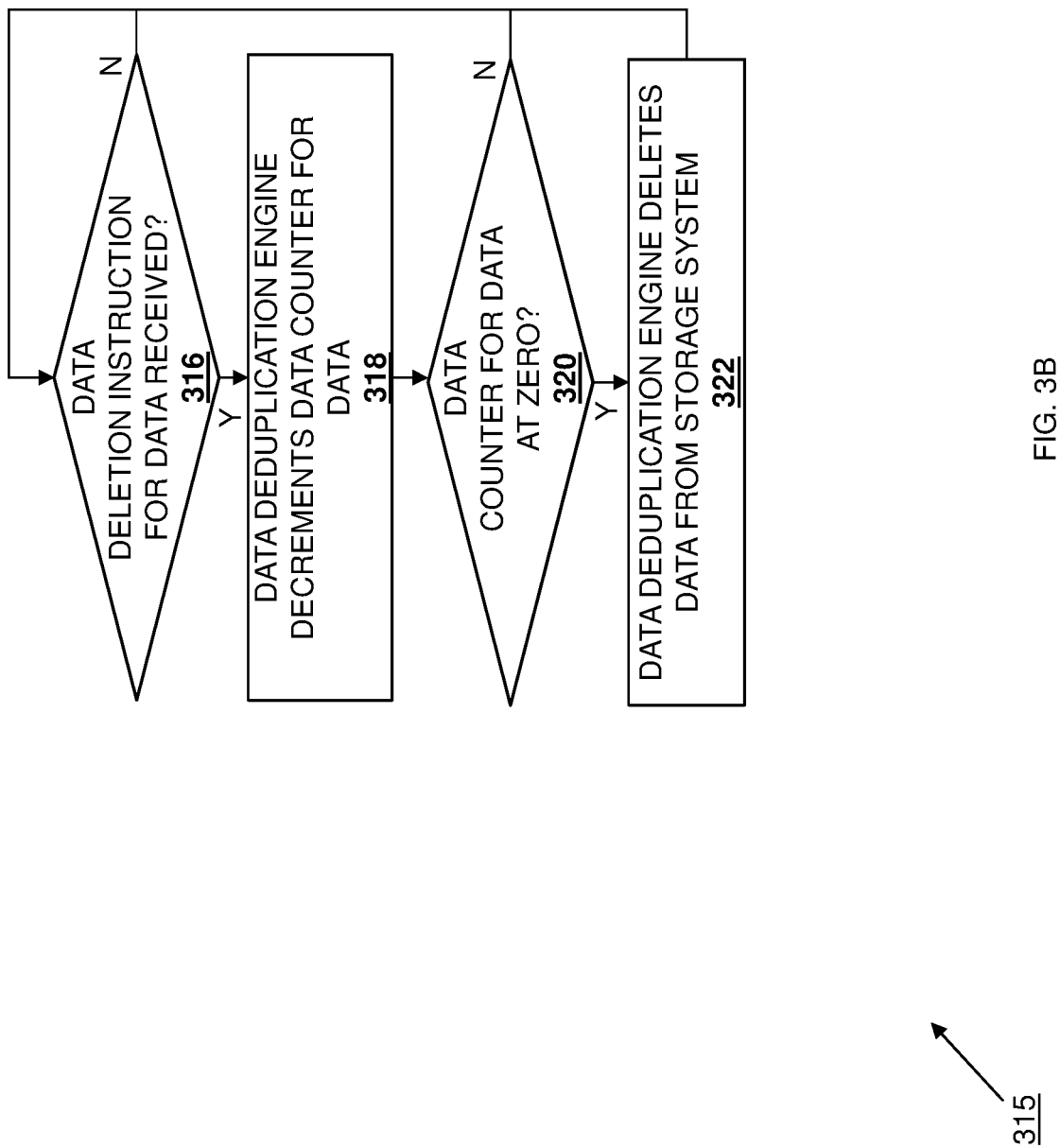
FIG. 3B is a flow chart illustrating an embodiment of a method for performing data deduplication operations using the data deduplication system of FIG. 2.

Furthermore, in addition to the method 300, a data deletion method 315 may be performed by the data deduplication system 200 as well. For example, with reference to FIG. 3B, the method 315 may begin at decision block 316 where it is determined whether a data deletion instruction for the data has been received. In an embodiment, at decision block 316, the data deduplication engine 208 may determine whether a deletion instruction is received from the host system 202 (e.g., from any host device, application host, or VM that previously provided data that was stored in the storage system 206 as described above, or that previously provided "duplicative" data that was handled by the data deduplication engine 206 as described above.) If, at decision block 316, it is determined that the data deletion instruction for the data has not been received, the method 300 returns to block 302. As such, the method 315 may loop to determine whether a deletion instruction for data that is stored in the storage system is received, with the method 300 operating as discussed above to store "new" data in the storage system along with the data deduplication identifier/data counter tuple for that data in the data deduplication database 210, and increment the data counter for "duplicative" data while discarding that "duplicative" data, as long as no deletion instruction for that data is received.

If, at decision block 316, it is determined that the data deletion instruction for the data has been received, the method 300 proceeds to block 318 where the data deduplication engine decrements the data counter for the data. In an embodiment, at block 318 and in response to determining that a deletion instruction is received from the host system 202 (e.g., from any host device, application host, or VM that previously provided data that was stored in the storage system 206 as described above, or that previously provided "duplicative" data that was handled by the data deduplication engine 206 as described above), the data deduplication engine 208 may operate to decrement the data counter that is associated with the data deduplication identifier for that data in the data deduplication database 210. The method 300 then proceeds to decision block 320 where it is determined whether the data counter for the data is at zero. In an embodiment, at decision block 320 and following the decrementing of the data counter that is associated with the data deduplication identifier for data in the data deduplication database 210, the data deduplication engine 208 will determine whether that data counter is at zero. If, at decision block 320, it is determined that the data counter for the data is not at zero, the method 300 returns to block 302. As such, the method 315 may loop to and decrement the data counter in response to data deletion instructions for data stored in the storage system as long as the data counter for that data is not at zero, with the method 300 operating as discussed above to store "new" data the storage system along with the data deduplication identifier/data counter tuple for that data in the data deduplication database 210, and increment the data counter for "duplicative" data while discarding that "duplicative" data.

If, at decision block 320, it is determined that the data counter for the data is at zero, the method 300 proceeds to block 322 where the data deduplication engine deletes the data from the storage system. In an embodiment, at block 322 and in response to determining that the data counter for data is at zero following the decrementing of that data counter in response to a deletion instruction for that data, the data deduplication engine 208 may cause that data to be deleted from the storage device in the storage subsystem upon which it is stored. The method 300 then returns to block 302. As such, the 315 may loop to decrement the data counter in response to data deletion instructions for data in the storage system as long as the data counter for that data is not at zero, and delete that data from the storage system in the event the data counter for that data is at zero following any decrementing operation, with the method 300 operating as discussed above to store "new" data the storage system along with the data deduplication identifier/data counter tuple for that data in the data deduplication database 210, and increment the data counter for "duplicative" data while discarding that "duplicative" data. As discussed above, a data counter for data that is at zero indicates that the last host device/application host/VM that previously provided that data for storage in the storage system 206 has requested its deletion, and thus that there is no need to continue to store that data in the storage system 206.

Thus, the data deduplication system 200 may operate according to the methods 300 and 315 to provide for target-based data deduplication operations that are performed by the storage system in order to address issues associated with source-based data deduplication operations that introduce compute/processing overhead for the host system/application host/VM. However, as discussed above, such target-based data deduplication operations provide for the transmission of data over the network from the host system to the storage system without performing data deduplication operations, thus using up network bandwidth for data that may be redundant and thus discarded by the backup appliance in the storage system during the data deduplication operations discussed above. The inventors of the present disclosure have developed the networking-level-based data deduplication system discussed below to address the issues introduced by both of the source-based data deduplication operations and target-based data deduplication operations discussed above.

Figure 5:
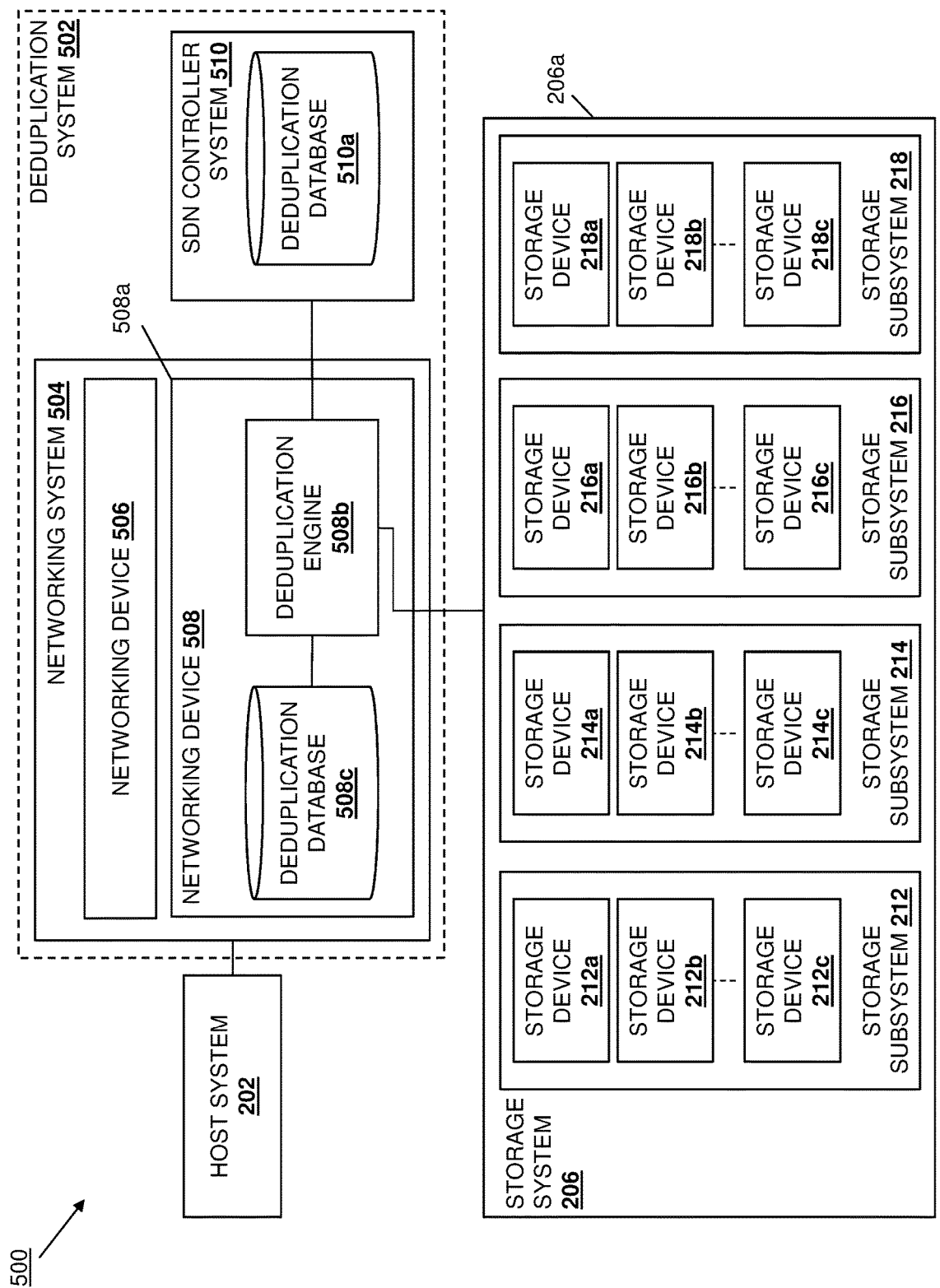
FIG. 5 is a schematic view illustrating an embodiment of a data deduplication system provided according to the teachings of the present disclosure.

With reference to FIG. 5, an embodiment of a data deduplication system 500 is illustrated that includes components that are similar to the components included in the data deduplication system 200, and thus are provided with the same reference numbers. In the illustrated embodiment, the data deduplication system 500 incudes the host system 202 discussed above with reference to FIG. 2. In the illustrated embodiment, the host system 202 is coupled to a deduplication system 502 that, in the example illustrated in FIG. 5, includes a networking system 504 that may be provided by the IHS 100 discussed above with reference to FIG. 1, and/or may include some or all of the components of the IHS 100. In the illustrated embodiment, the networking system 504 includes a pair of networking devices 506 and 508 such as, for example, switch devices. For example, either or both of the networking devices 506 and 508 may be provided by "open-network" Top Of Rack (TOR) switch devices, which one of skill will recognize may each be provided by a switch device that includes the open-source LINUX® operating system and that is configured to be programmed with network-level functionality in order to, for example, optimize TOR operations or overall system operations, as well as provide for the functionality discussed below. However, while illustrated and discussed as a being provided by a pair of open-network TOR switch devices, one of skill in the art in possession of the present disclosure will recognize that the networking system 504 may include any devices that may be configured to operate similarly as the networking device(s) 506 and 508 discussed below.

The networking device 508 is illustrated as including a chassis 508a that houses the components of the networking device 508, only some of which are illustrated below. For example, the chassis 508a may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a deduplication engine 508b that is configured to perform the functionality of the deduplication engines and/or networking devices discussed below. In a specific example, the deduplication engine 508b may be provided by a networking processing system that is included in the networking device 508, although other deduplication processing systems will fall within the scope of the present disclosure as well. The chassis 508a may also house a storage system (not illustrated, but which may include the storage 108 discussed above with reference to FIG. 1) that is coupled to the deduplication engine 508b (e.g., via a coupling between the storage system and the processing system) and that includes a deduplication database 508c that is configured to store any of the information utilized by the deduplication engine 508b discussed below. In a specific example, the deduplication database 508c may be provided by a storage system included in the chassis 508a of the networking device 508, which as discussed below may include limited storage capacity.

While not explicitly illustrated, one of skill in the art in possession of the present disclosure will recognize that the networking device 506 may include similar components (e.g., a deduplication engine and deduplication database) that are configured to perform functionality similar to the functionality discussed below for the networking device 508. For example, one of skill in the art in possession of the present disclosure will appreciate that the networking system 504 may provide a highly available networking system that may utilized networking devices 506 and 508 (e.g., TOR switch devices) that are configured in a redundant manner. As such, while illustrated and described as being provided by the networking device 508, the deduplication engine 508b and deduplication database 508c may be provided in a cohesive, consistent manner via the networking system 504 by either of the networking devices 506 and 508 via their redundant configuration discussed above.

As illustrated in FIG. 5, the deduplication system 502 also includes a Software-Defined Network (SDN) controller system 510 that is coupled to the networking system 504 and that may be provided by the IHS 100 discussed above with reference to FIG. 1, and/or may include some or all of the components of the IHS 100. For example, the SDN controller system 510 may be provided as part of the storage system 206 (e.g., on a VM running on a device in the storage system 206), or outside the storage system 206 (e.g., as part of or connected to a leaf switch device or aggregator switch device that are coupled to the TOR switch devices that provide the networking devices 506 and 508.) In addition to a variety of SDN processing functionality discussed below, the SDN controller system 510 may include a storage system (not illustrated, but which may include the storage 108 discussed above with reference to FIG. 1) that is coupled to the deduplication engine 508b (e.g., via a coupling between the storage system in the SDN controller system 510 and the processing system in the networking device 508) and that includes a deduplication database 510a that is configured to store any of the information utilized by the deduplication engine 508b discussed below. As will be appreciated by one of skill in the art in possession of the present disclosure, the storage system in the SDN controller system 510 may include a larger storage capacity relative to the networking device 508, and thus may be utilized in the manner discussed below.

In the illustrated embodiment, the networking system 504 is also coupled to the storage system 206 discussed above with reference to FIG. 2, with the exception that the storage system 206 no longer includes the deduplication engine 208 and the deduplication database 210 discussed above. Thus, in some embodiments, the data deduplication system 500 provides for the removal of the deduplication engine 208 and deduplication database 210 from the storage system 206, and the provisioning of the deduplication engine 508b and the deduplication database 508c in the networking device 508 (and corresponding components in the networking device 506), as well as the deduplication database 510a in the SDN controller system 510. Similarly as discussed above, while a single data deduplication system 500 is illustrated, one of skill in the art in possession of the present disclosure will recognize that more data deduplication systems may be provided while remaining within the scope of the present disclosure. Furthermore, while a specific data deduplication system 500 has been illustrated and described, one of skill in the art in possession of the present disclosure will recognize that the data deduplication system of the present disclosure may include a variety of components and component configurations while remaining within the scope of the present disclosure as well.

Figure 6:
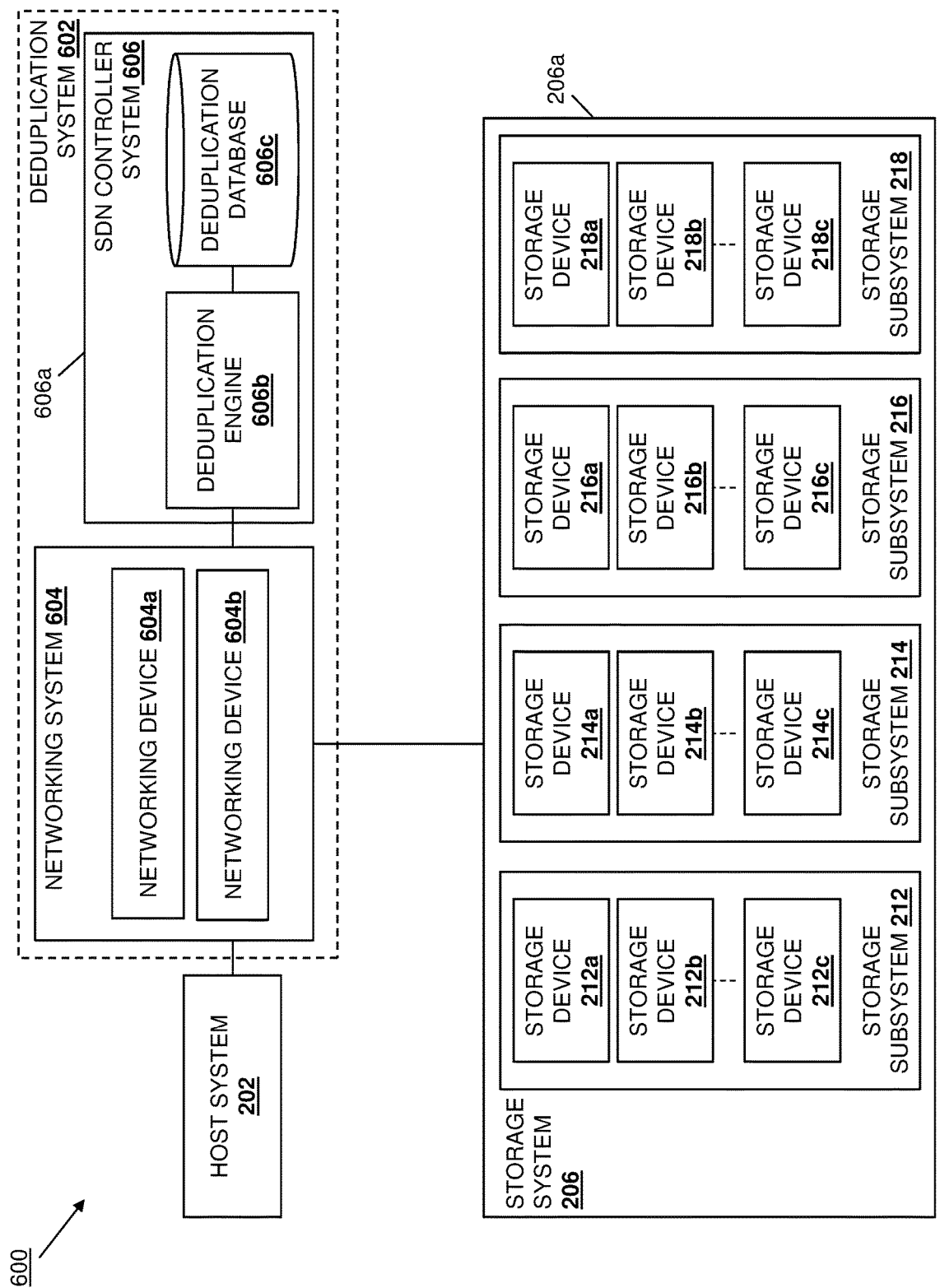
FIG. 6 is a schematic view illustrating an embodiment of a data deduplication system provided according to the teachings of the present disclosure.

With reference to FIG. 6, an embodiment of a data deduplication system 600 is illustrated that includes components that are similar to the components included in the data deduplication system 200, and thus are provided with the same reference numbers. In the illustrated embodiment, the data deduplication system 600 incudes the host system 202 discussed above with reference to FIG. 2. In the illustrated embodiment, the host system 202 is coupled to a deduplication system 602 that, in the example illustrated in FIG. 6, includes a networking system 604 that may be provided by the IHS 100 discussed above with reference to FIG. 1, and/or may include some or all of the components of the IHS 100. In the illustrated embodiment, the networking system 604 includes a pair of networking devices 604a and 604b such as, for example, switch devices. However, while illustrated and discussed as a being provided by a pair of switch devices, one of skill in the art in possession of the present disclosure will recognize that the networking system 604 may include any devices that may be configured to operate similarly as the networking device(s) 604a and 604b discussed below.

As illustrated in FIG. 6, the deduplication system 602 also includes a Software-Defined Network (SDN) controller system 606 that is coupled to the networking system 604 and that may be provided by the IHS 100 discussed above with reference to FIG. 1, and/or may include some or all of the components of the IHS 100. For example, the SDN controller system 606 may be provided as part of the storage system 206 (e.g., on a VM running on a device in the storage system 206), or outside the storage system 206 (e.g., as part of or connected to a leaf switch device or aggregator switch device that are coupled to TOR switch devices that provide the networking devices 506 and 508.) The SDN controller system 606 is illustrated as including a chassis 606a that houses the components of the SDN controller system 606, only some of which are illustrated below. For example, the chassis 606a may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a deduplication engine 606b that is configured to perform the functionality of the deduplication engines and/or SDN controller systems discussed below. The chassis 606a may also house a storage system (not illustrated, but which may include the storage 108 discussed above with reference to FIG. 1) that is coupled to the deduplication engine 606b (e.g., via a coupling between the storage system and the processing system) and that includes a deduplication database 606c that is configured to store any of the information utilized by the deduplication engine 606b discussed below.

In the illustrated embodiment, the networking system 604 is also coupled to the storage system 206 discussed above with reference to FIG. 2, with the exception that the storage system 206 no longer includes the deduplication engine 208 and the deduplication database 210 discussed above. Thus, in some embodiments, the data deduplication system 600 provides for the removal of the deduplication engine 208 and deduplication database 210 from the storage system 206, and the provisioning of the deduplication engine 606b and the deduplication database 606c in the SDN controller system 606 that is coupled to the networking system 604. Similarly as discussed above, while a single data deduplication system 606 is illustrated, one of skill in the art in possession of the present disclosure will recognize that more data deduplication systems may be provided while remaining within the scope of the present disclosure. Furthermore, while a specific data deduplication system 606 has been illustrated and described, one of skill in the art in possession of the present disclosure will recognize that the data deduplication system of the present disclosure may include a variety of components and component configurations while remaining within the scope of the present disclosure as well.

Figure 7A:
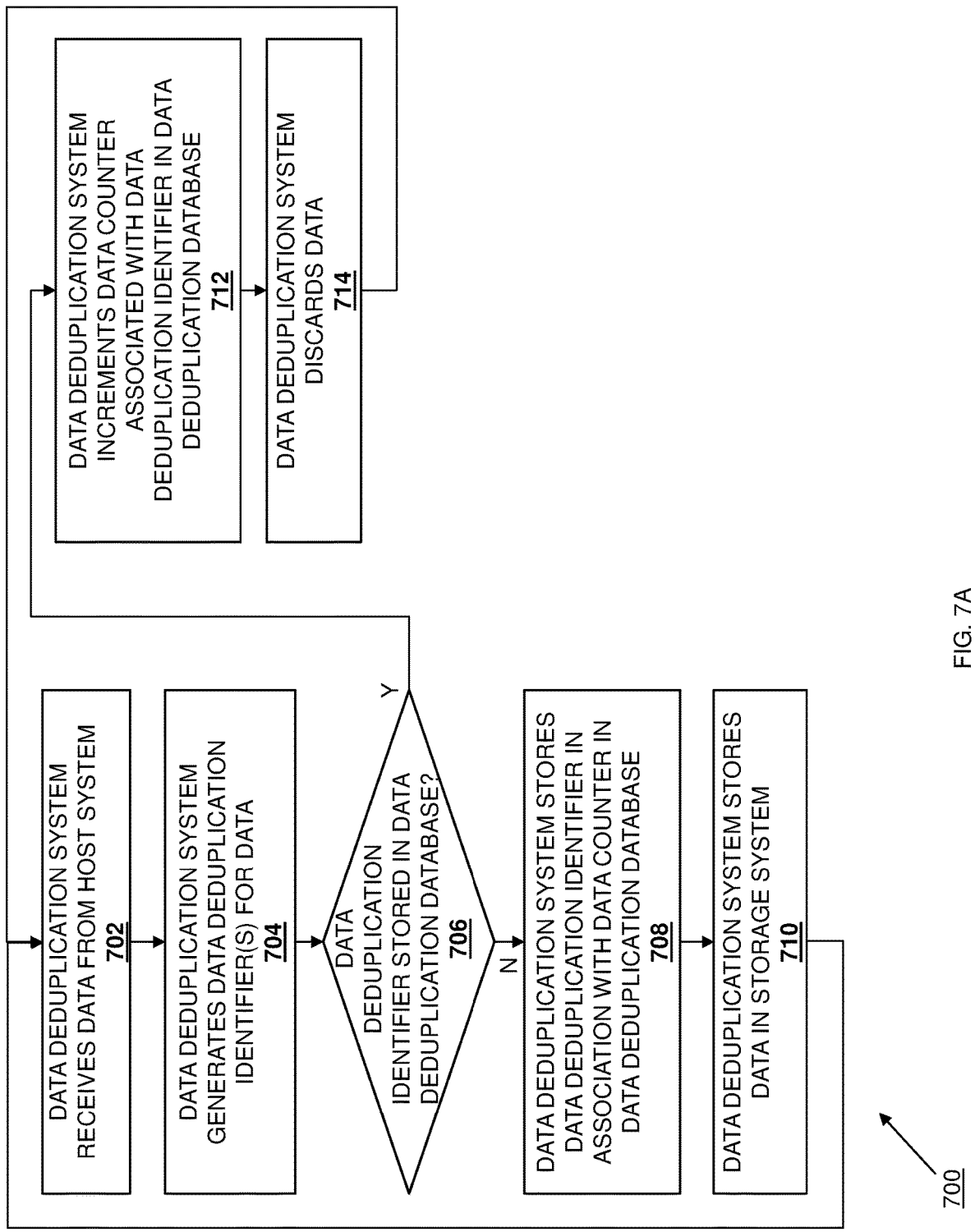
FIG. 7A is a flow chart illustrating an embodiment of a method for performing data deduplication operations using the data deduplication system of FIG. 5 or 6.

Referring now to FIG. 7A, an embodiment of a method 700 for performing data deduplication operations using the data deduplication systems 500 or 600 is illustrated. As discussed below, the systems and methods of the present disclosure move data deduplication operations to the networking level between the host system that generates data and the storage system that stores that data, thus offloading the data deduplication processing overhead from the host system, while conserving bandwidth on the network path to the storage system. For example, the data deduplication systems of the present disclosure may include a data deduplication subsystem coupled between a host system and a storage system such as, for example, in a networking device that transmits data between the host system and the storage system, and/or in an SDN controller device coupled to that networking device. The data deduplication system receives data from the host system, generates a data deduplication identifier for the data, and determines whether the data deduplication identifier for the data is stored in a data deduplication database. In response to determining that the data deduplication identifier for the data is not stored in the data deduplication database, the data deduplication system stores the data deduplication identifier for the data in the data deduplication database in association with a data counter for the data, and transmits the data to the storage system for storage. In response to determining that the data deduplication identifier for the data is stored in the data deduplication database, the data deduplication system increments a data counter that is associated with the data deduplication identifier for the data in the data deduplication database, and discards the data. As such, "inline" data deduplication operations are described that reduce host system processing overhead while conserving network bandwidth on the path to the storage system.

Figure 8:
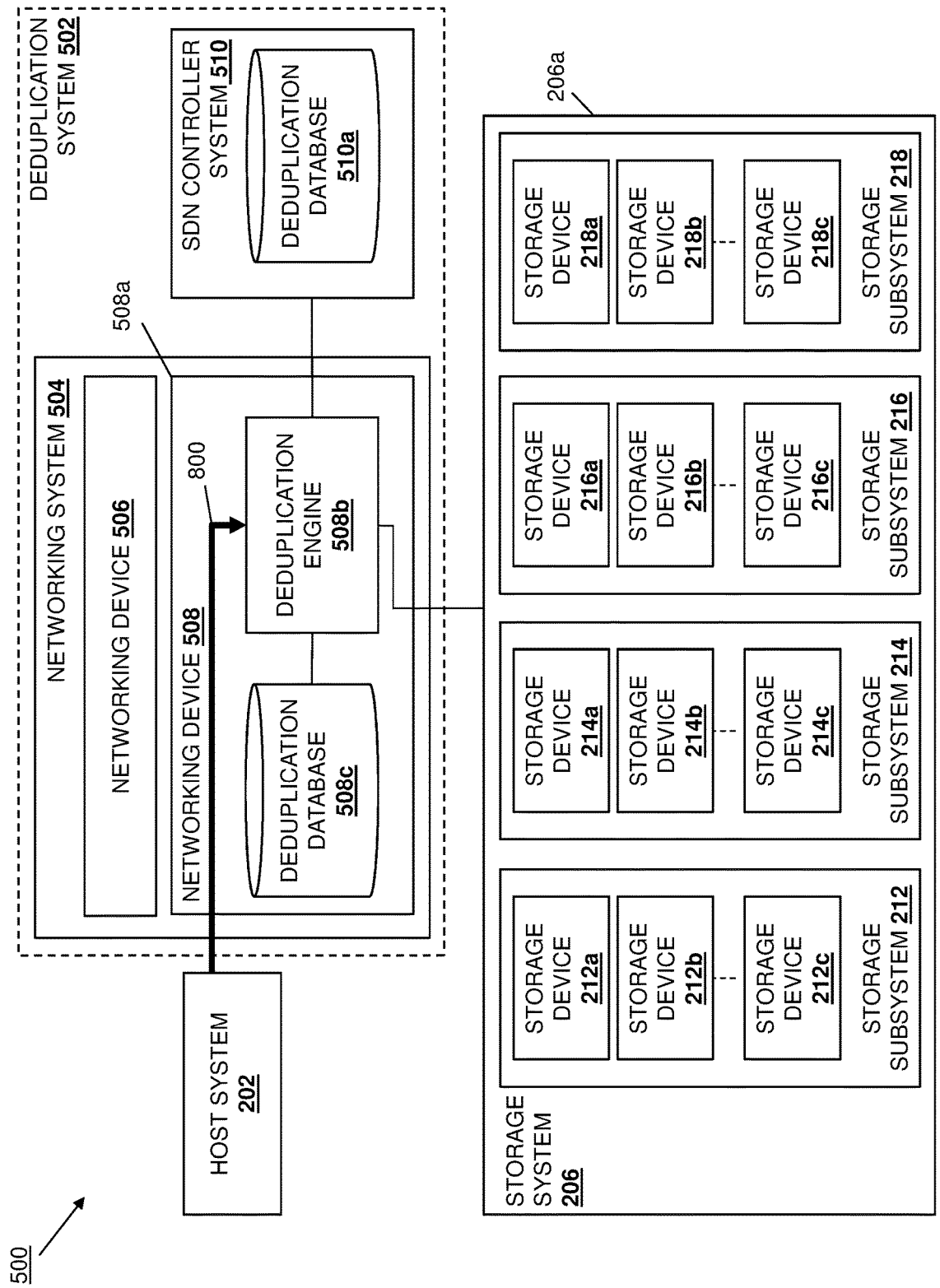
FIG. 8 is a schematic view illustrating an embodiment of the data deduplication system of FIG. 5 operating during the method of FIG. 7.
Figure 9:
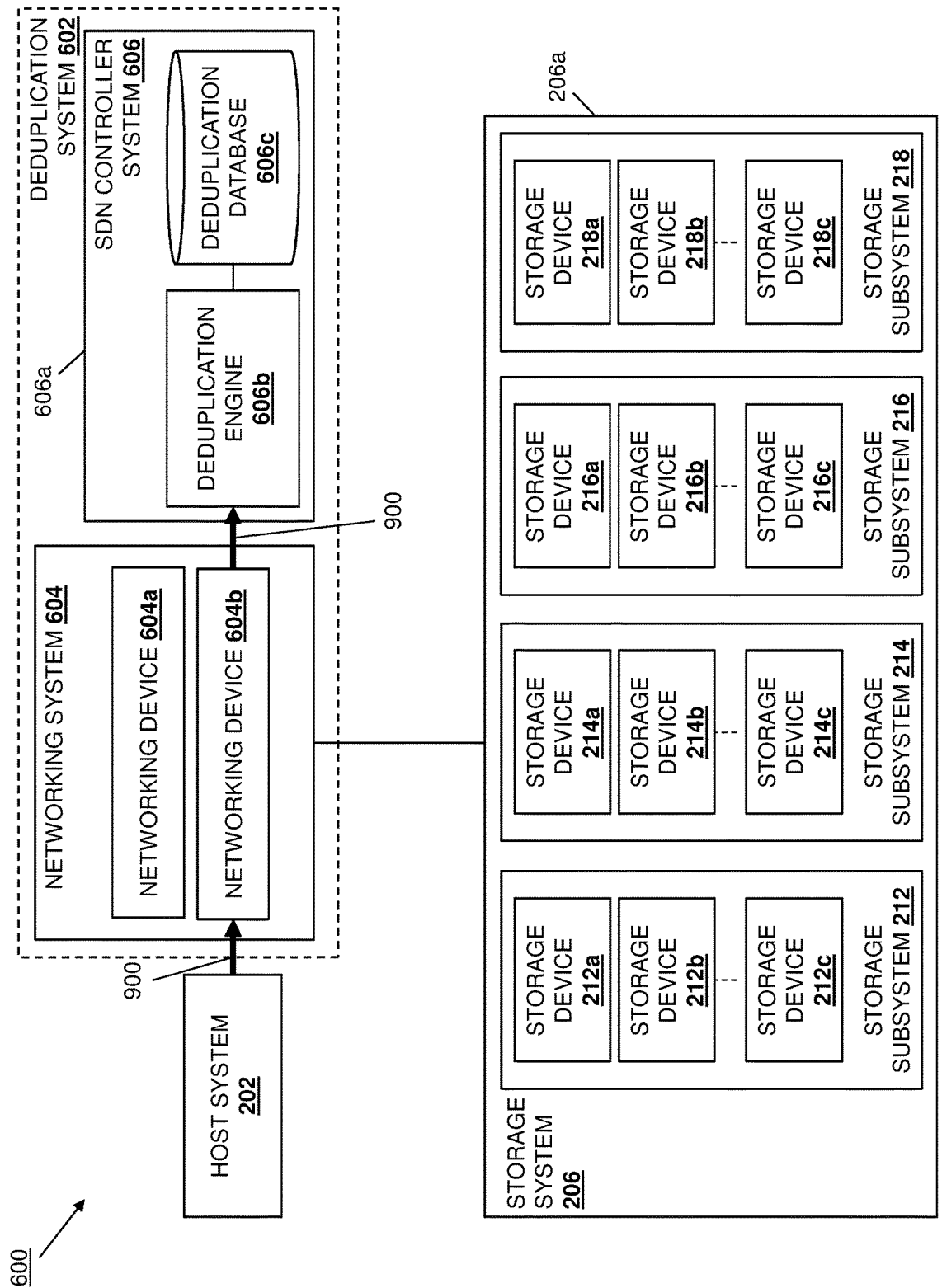
FIG. 9 is a schematic view illustrating an embodiment of the data deduplication system of FIG. 6 operating during the method of FIG. 7.

The method 700 begins at block 702 where a data deduplication engine receives data from a host system. With reference to the data deduplication system 500 illustrated in FIG. 8, in an embodiment of block 702, the host system 202 (e.g., an application host, VM, etc.) may generate and transmit data 800 such that the data is received by the deduplication engine 508b provided by the networking device 204b in the networking system 204. With reference to the data deduplication system 600 illustrated in FIG. 9, in an embodiment of block 702, the host system 202 (e.g., an application host, VM, etc.) may generate and transmit data 900 such that the data is received by the networking device 604b in the networking system 604, and forwarded by the networking device 604b to the deduplication engine 606b in the SDN controller system 606. Similarly to the specific examples provided above, the application host or VM included in the host system 202 may transmit a data packet that includes the data 800 or the data 900, and that data packet may be received by the deduplication engine 508b, or received by the networking device 604b and forwarded to the deduplication engine 606b.

Figure 10:
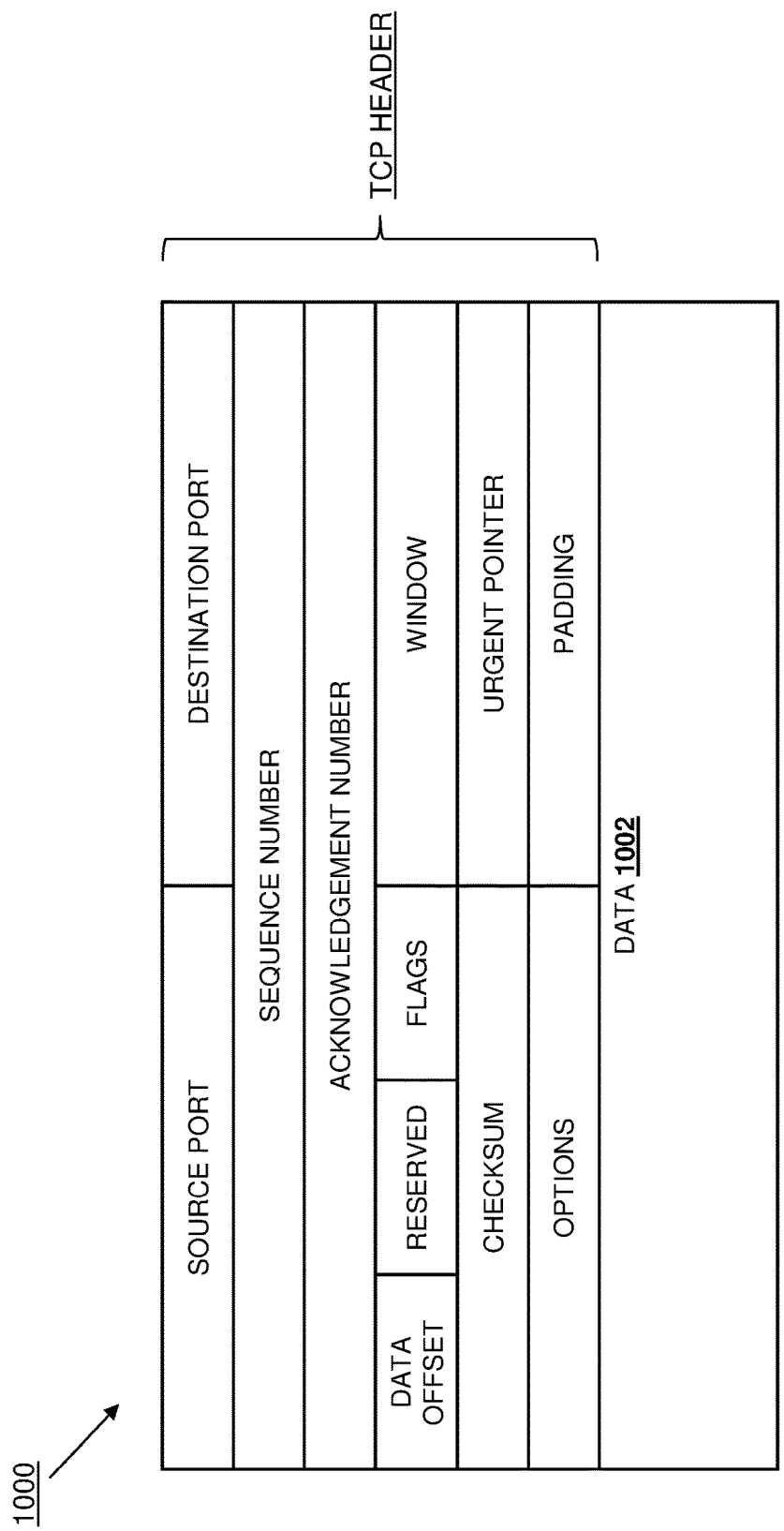
FIG. 10 is a schematic view illustrating an embodiment of a data packet transmitted during the method of FIG. 7.

With reference to FIG. 10, an embodiment of a TCP/IP data packet 1000 is illustrated that may be transmitted by the host system 202 at block 702, and that includes data 1002 that may provide the data 800 or the data 900 discussed above (and that is used interchangeably to describe either of the data 800 or the data 900 in some of the examples below).

In some embodiments, the host system 202 (e.g., an application host or VM) may be configured to write in a variety of TCP/IP data packet sizes, but may operate to ensure that the first 128 bits of the data portion of the TCP/IP data packet (which stores the data 1002 in the data packet 1000 in FIG. 10) are empty (i.e., "NULL").

Figure 11A:
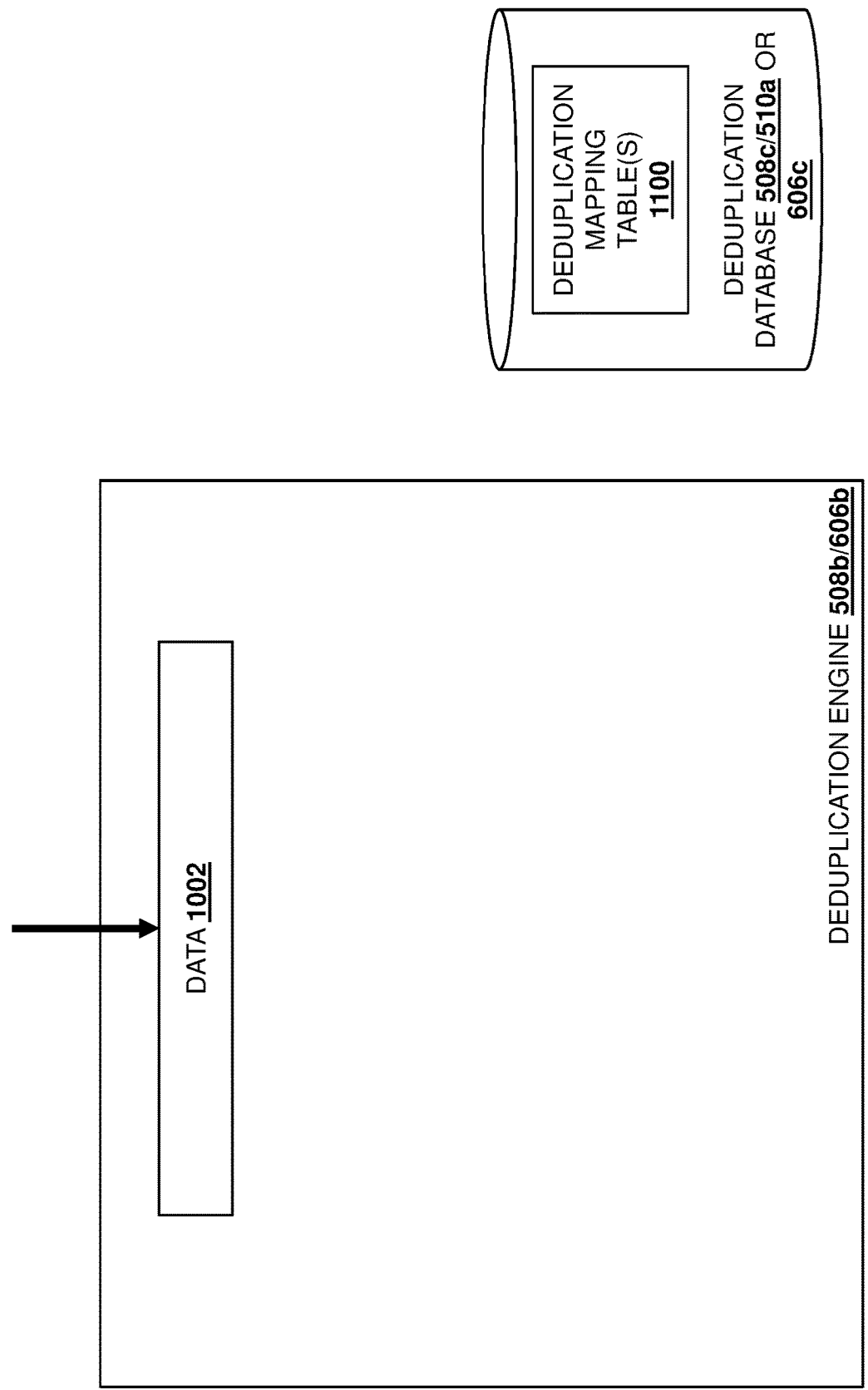
FIG. 11A is a schematic view illustrating an embodiment of the data deduplication system of FIG. 5 or 6 operating during the method of FIG. 7.
Figure 11B:
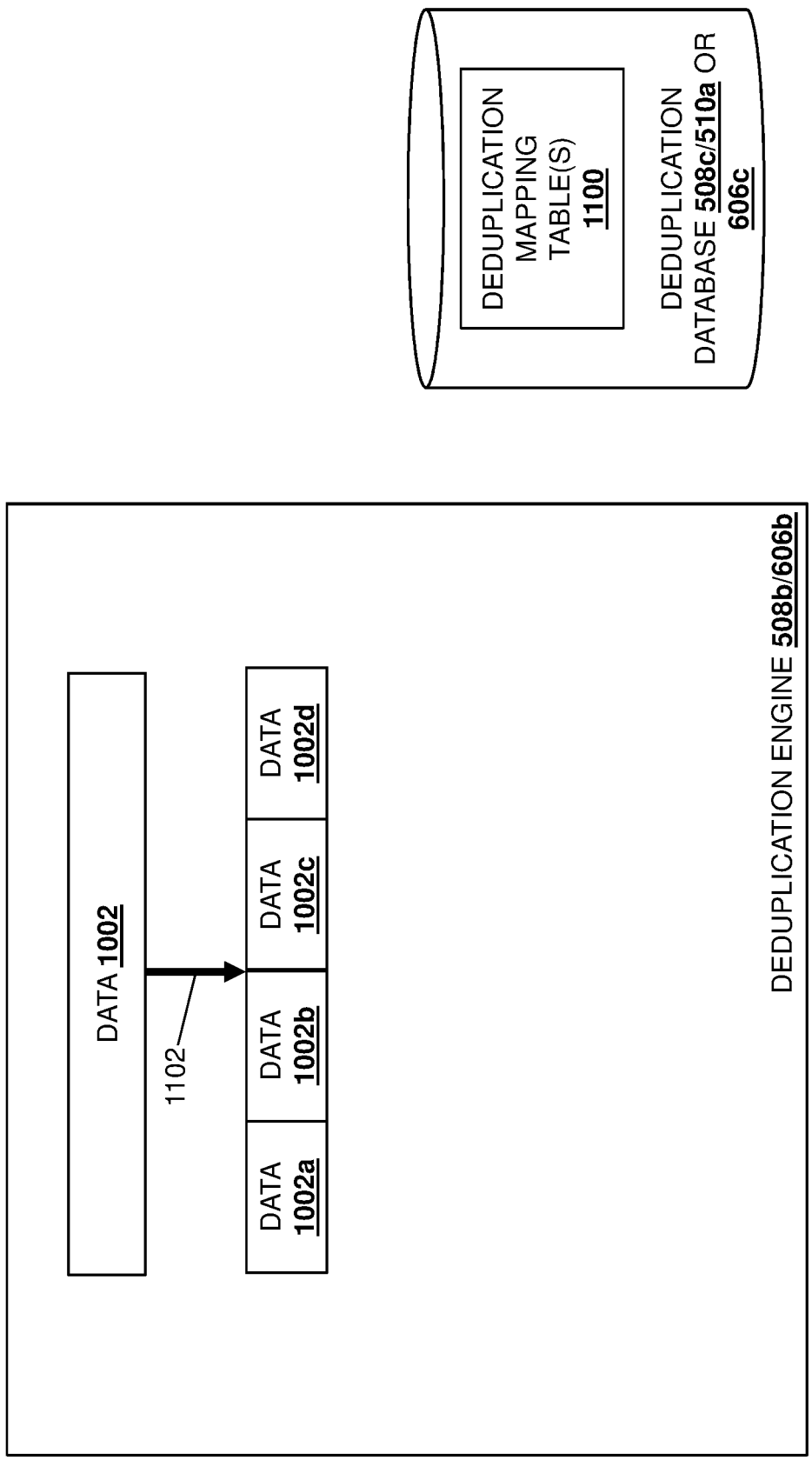
FIG. 11B is a schematic view illustrating an embodiment of the data deduplication system of FIG. 5 or 6 operating during the method of FIG. 7.
Figure 11C:
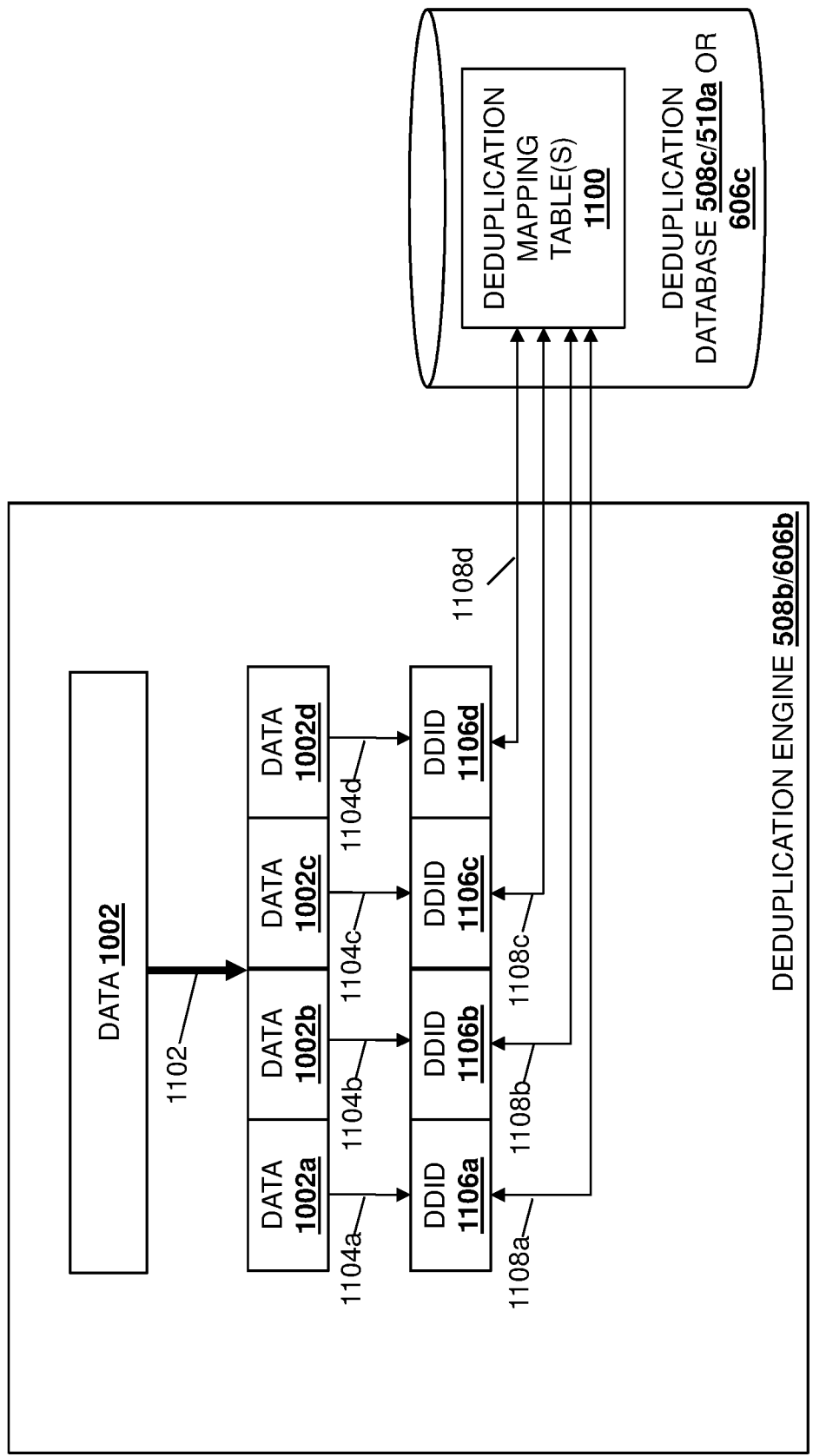
FIG. 11C is a schematic view illustrating an embodiment of the data deduplication system of FIG. 5 or 6 operating during the method of FIG. 7.

The method 700 then proceeds to block 704 where the data deduplication engine generates data deduplication identifiers for the data. With reference to FIGS. 11A, 11B, and 11C, in an embodiment of block 704, the deduplication engine 508b or 606b may receive the data 1002 and perform data chunking operations 1102 to generate data chunks 1002a, 1002b, 1002c, and 1002d, and then may perform respective hashing operations 1104a, 1104b, 1104c, and 1104d on the data chunks 1002a, 1002b, 1002c, and 1002d in order to generate respective data deduplication identifiers 1106a, 1106b, 1106c, and 1106d. As will be appreciated by one of skill in the art in possession of the present disclosure, the hashing operations 1104a-1104d performed on the data chunks 1002a-1002d operate to map each data chunk (which may have arbitrary size) to its associated data deduplication identifier that is unique for that data chunk for that data chunk in the data deduplication system 500 or 600, and that may have a fixed size. However, while hashing operations are discussed herein, one of skill in the art in possession of the present disclosure will recognize that other operations may be utilized to generate the data deduplication identifiers discussed above while remaining within the scope of the present disclosure as well.

The method 700 then proceeds to decision block 706 where it is determined whether a data deduplication identifier is stored in a data deduplication database. With reference to FIG. 11C, in an embodiment of decision block 706, the data deduplication engine 508b or 606b may perform respective checking operations 1108a, 1108b, 1108c, and 1108d to check whether the data deduplication identifiers 1106a-1106d generated at block 704 are already stored in deduplication mapping table(s) 1100 in the deduplication database 508c/510a or 606c. As discussed below, "new" data received from the host system 202 (e.g., data that is not duplicative of data that is currently stored in the storage system 206) may have its data deduplication identifier generated and stored in the data deduplication database 508c/510a or 606c as part of its storage in the storage system 206 and, as such, at decision block 706 the data deduplication engine 508b or 606b may compare each data deduplication identifier 1106a-1106d generated at block 704 with the data deduplication identifiers stored in the deduplication mapping table(s) 1100 in the deduplication database 508c/510a or 606c to determine whether the data chunks 1002a-1002d are "new" data or "duplicative" data received from the host system 202 (e.g., data that is duplicative of data that is currently stored in the storage system 206.)

Figure 12A:
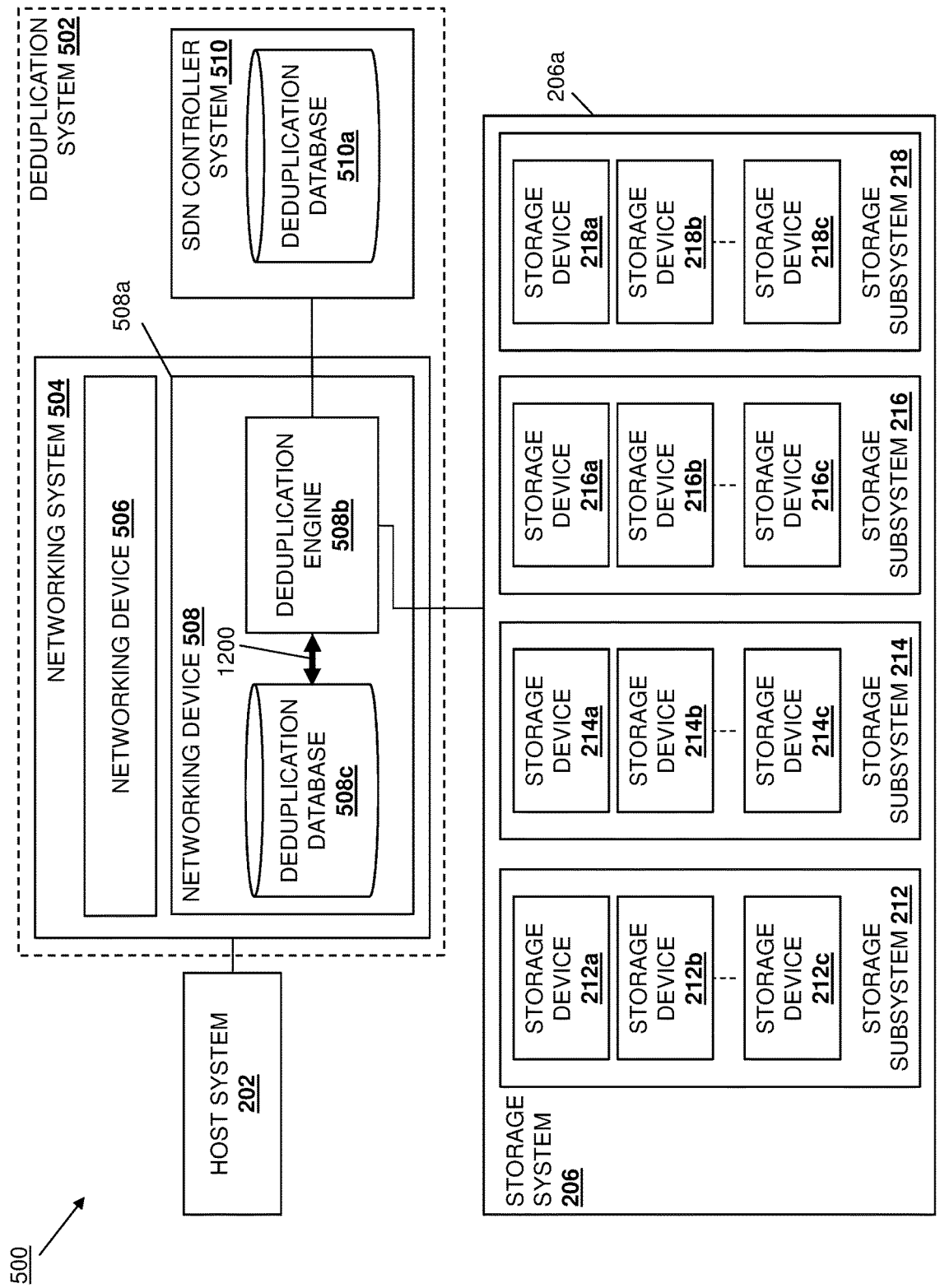
FIG. 12A is a schematic view illustrating an embodiment of the data deduplication system of FIG. 5 operating during the method of FIG. 7.
Figure 12B:
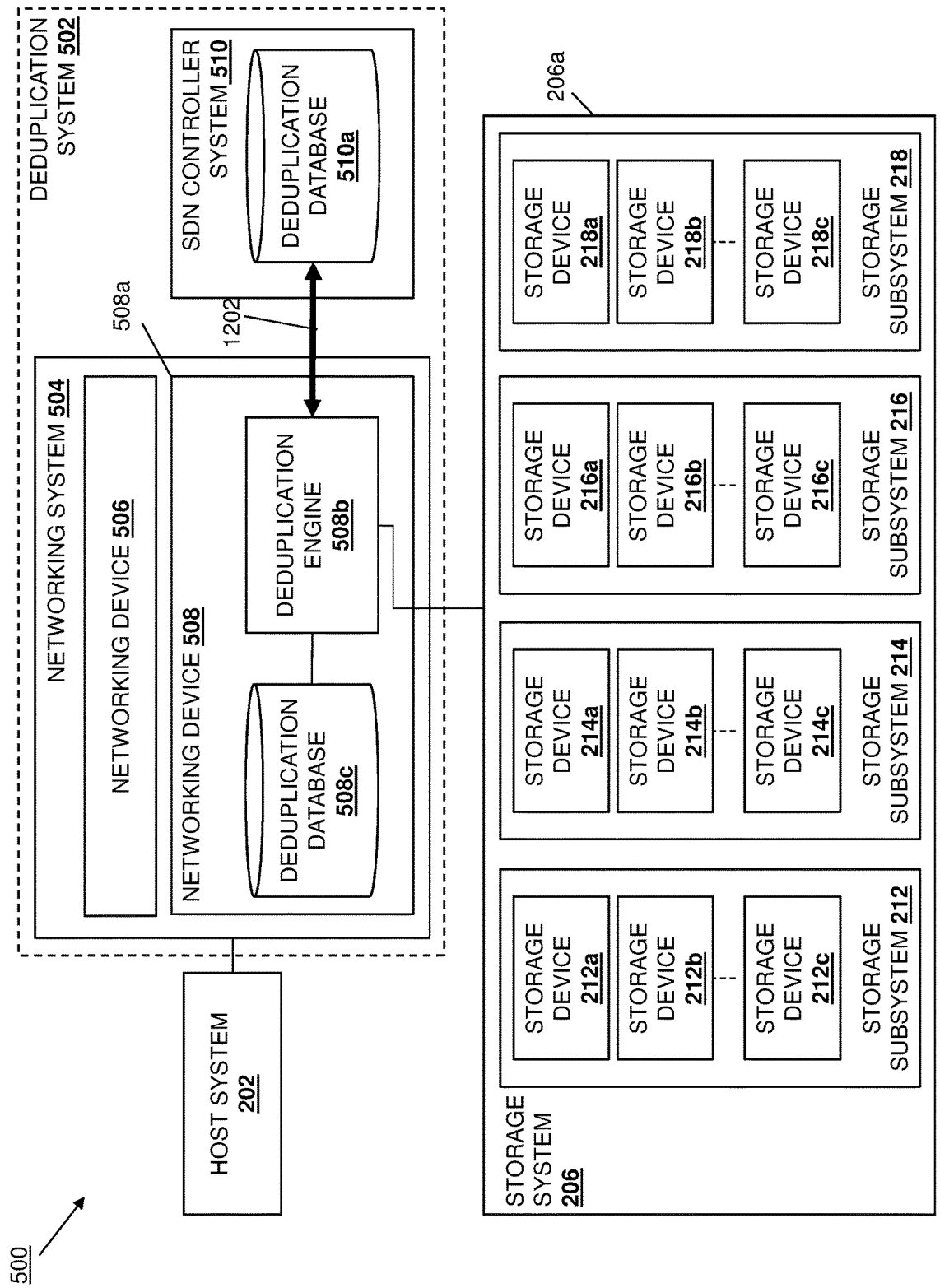
FIG. 12B is a schematic view illustrating an embodiment of the data deduplication system of FIG. 5 operating during the method of FIG. 7.

With reference to the data deduplication system 500, and as illustrated in FIGS. 12A and 12B, the determination of whether a data deduplication identifier is stored in a data deduplication database in the data deduplication system 500 may include the deduplication engine 508b performing a first checking operation 1200 to determine whether the data deduplication identifier generated at block 704 is already stored in the deduplication mapping table(s) 1100 in the deduplication database 508c. In the event that the first checking operation 1200 determines that a data deduplication identifier generated at block 704 is already stored in the deduplication mapping table(s) 1100 in the deduplication database 508c, the method 700 may proceed to block 712, discussed in further detail below. In the event that the first checking operation 1200 determines that a data deduplication identifier generated at block 704 is not already stored in the deduplication mapping table(s) 1100 in the deduplication database 508c, the deduplication engine 508b may perform a second checking operation 1202 to determine whether the data deduplication identifier generated at block 704 is already stored in the deduplication mapping table(s) 1100 in the deduplication database 510a.

For example, the second checking operation 1202 may include the deduplication engine 508b sending the data deduplication identifier along with a request to check it against the deduplication mapping table(s) 1100 in the deduplication database 510a to the SDN controller system 510, and the SDN controller system 510 may perform the data deduplication identifier check to determine whether the data deduplication identifier generated at block 704 is already stored in the deduplication mapping table(s) 1100 in the deduplication database 510a, and then report back the results of the data deduplication identifier check to the deduplication engine 508b. As discussed below, the storage capacity of the networking device 508 available for the deduplication database 508c may be relatively limited compared to the storage capacity of the SDN controller system 510 available for the deduplication database 510a, and thus a relatively smaller number of more recently received data deduplication identifier/data counter tuples may be stored in the deduplication database 508c relative to the deduplication database 510a, with the deduplication engine 508b periodically copying the data deduplication identifier/data counter tuples from the deduplication database 508c to the deduplication database 510a as discussed in further detail below. However, while described as being moved from the deduplication database 508c in the networking device 508 to the deduplication database 510a in the SDN controller system 510, one of skill in the art in possession of the present disclosure will recognize that the deduplication database 508c may be provided in a variety of storage systems that are external to the networking device 508 while remaining within the scope of the present disclosure as well.

Figure 12C:
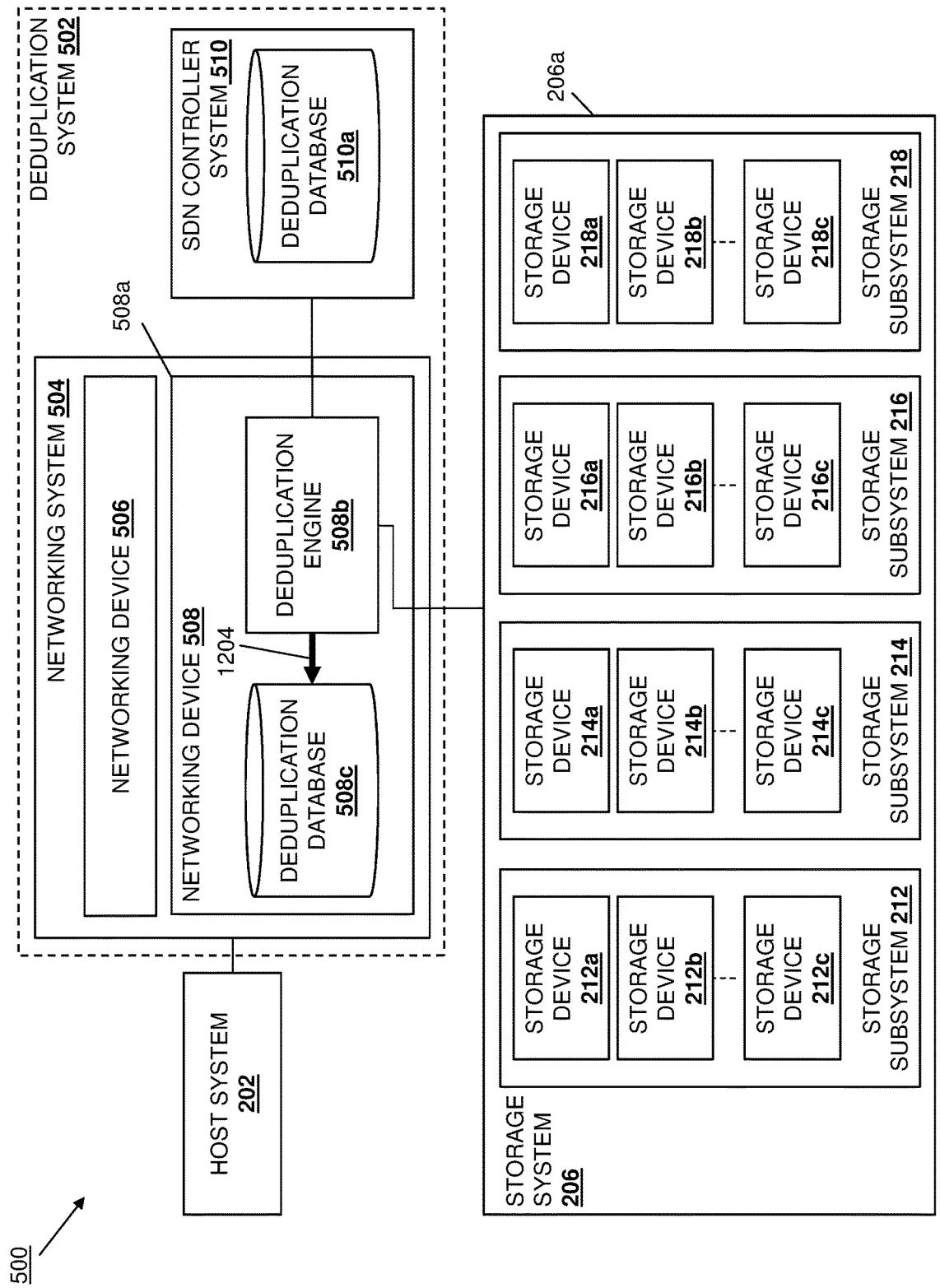
FIG. 12C is a schematic view illustrating an embodiment of the data deduplication system of FIG. 5 operating during the method of FIG. 7.

With reference to the data deduplication system 500, if at decision block 706 it is determined that the data deduplication identifier is not stored in the data deduplication database, the method 700 proceeds to block 708 where the data deduplication engine stores the data deduplication identifier in association with a data counter in the data deduplication database. With reference to FIG. 12C, in an embodiment of block 708 and following a determination at decision block 706 that a data deduplication identifier generated for a respective data chunk is not stored in the deduplication mapping table(s) 1100 in the deduplication databases 508c/510a, the data deduplication engine 508b may perform data deduplication identifier storage operations 1204 to store the data deduplication identifier generated for that respective data chunk in the deduplication mapping table(s) 1100 in the deduplication database 508c. Furthermore, any data deduplication identifier stored in the deduplication mapping table(s) 1100 in the data deduplication database 508c may be stored as part of a data deduplication identifier/data counter tuple for its associated data that includes that data deduplication identifier for that data and a data counter for that data, discussed in further detail below.

Figure 12D:
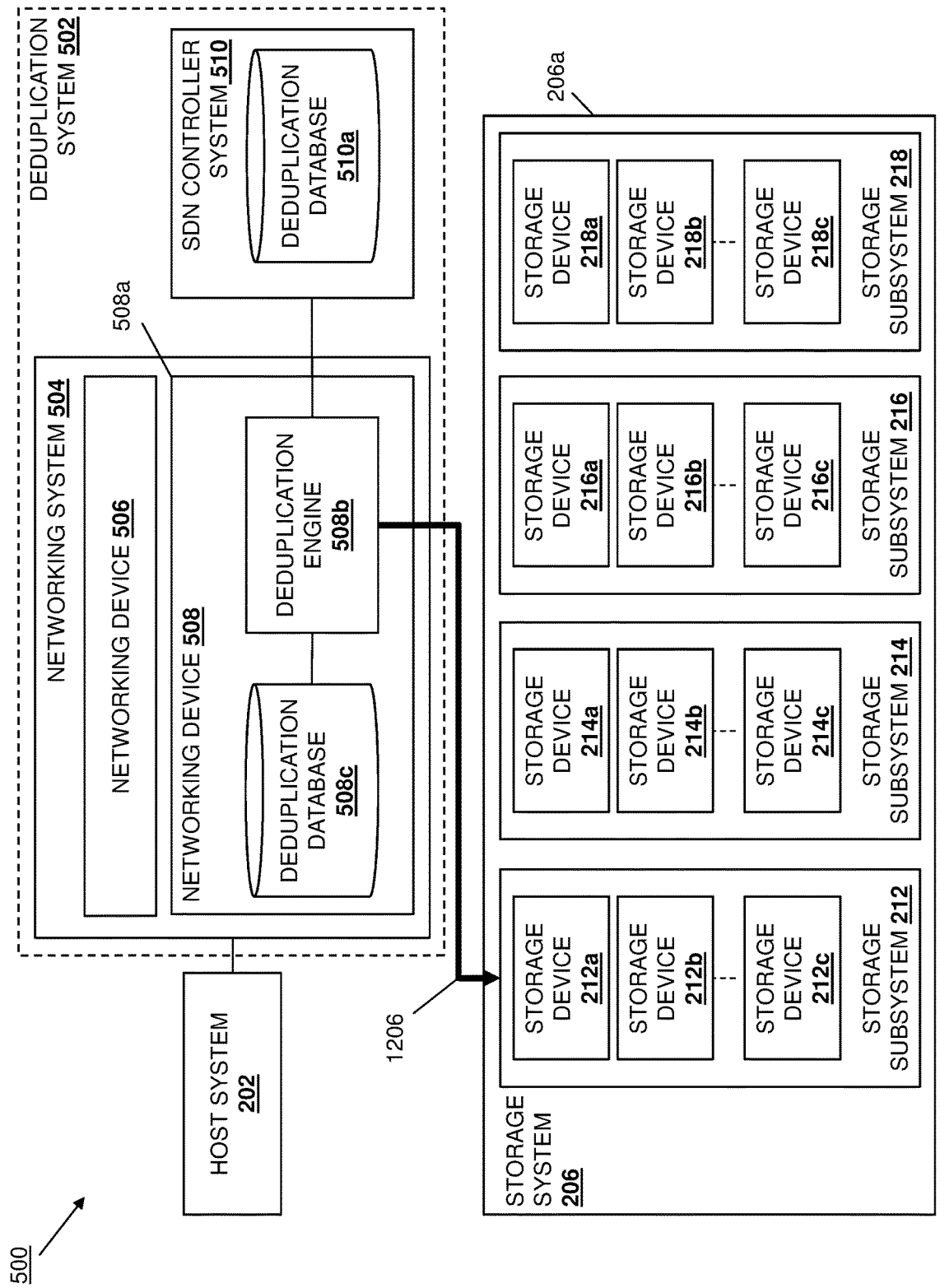
FIG. 12D is a schematic view illustrating an embodiment of the data deduplication system of FIG. 5 operating during the method of FIG. 7.

The method 700 then proceeds to block 710 where the data deduplication engine stores the data in a storage system. With reference to FIG. 12D, in an embodiment of block 710, the data deduplication engine 508b may then perform data storage operations 1206 to store the data 800/1002 that was received at block 702 in a storage device in one of the storage subsystems 212-218 in the storage system 206. In some embodiments, the data stored in the storage system 206 may be stored in association with the data deduplication identifier for that data. For example, as discussed above, the host system 202 may operate to ensure that the first 128 bits of the data portion of a TCP/IP data packet which stores the data (e.g., in the data packet 1000 in FIG. 10) is empty (i.e., "NULL"), and at block 710 the data deduplication engine 508b may include the data deduplication identifier for that data in that 128 bits in the data portion of the data packet. As will be appreciated by one of skill in the art in possession of the present disclosure, the inclusion of the data deduplication identifier with the data that is stored in the storage system 206 may provide a variety of benefits. For example, in the event of a failure, loss, or other unavailability of the data deduplication database(s), the data deduplication identifiers included with the data stored in the storage system 206 may be utilized to rebuild the data deduplication database(s) (e.g., by retrieving those data deduplication identifiers included with the data stored in the storage system 206 and providing them in a new data deduplication database.)

Figure 12E:
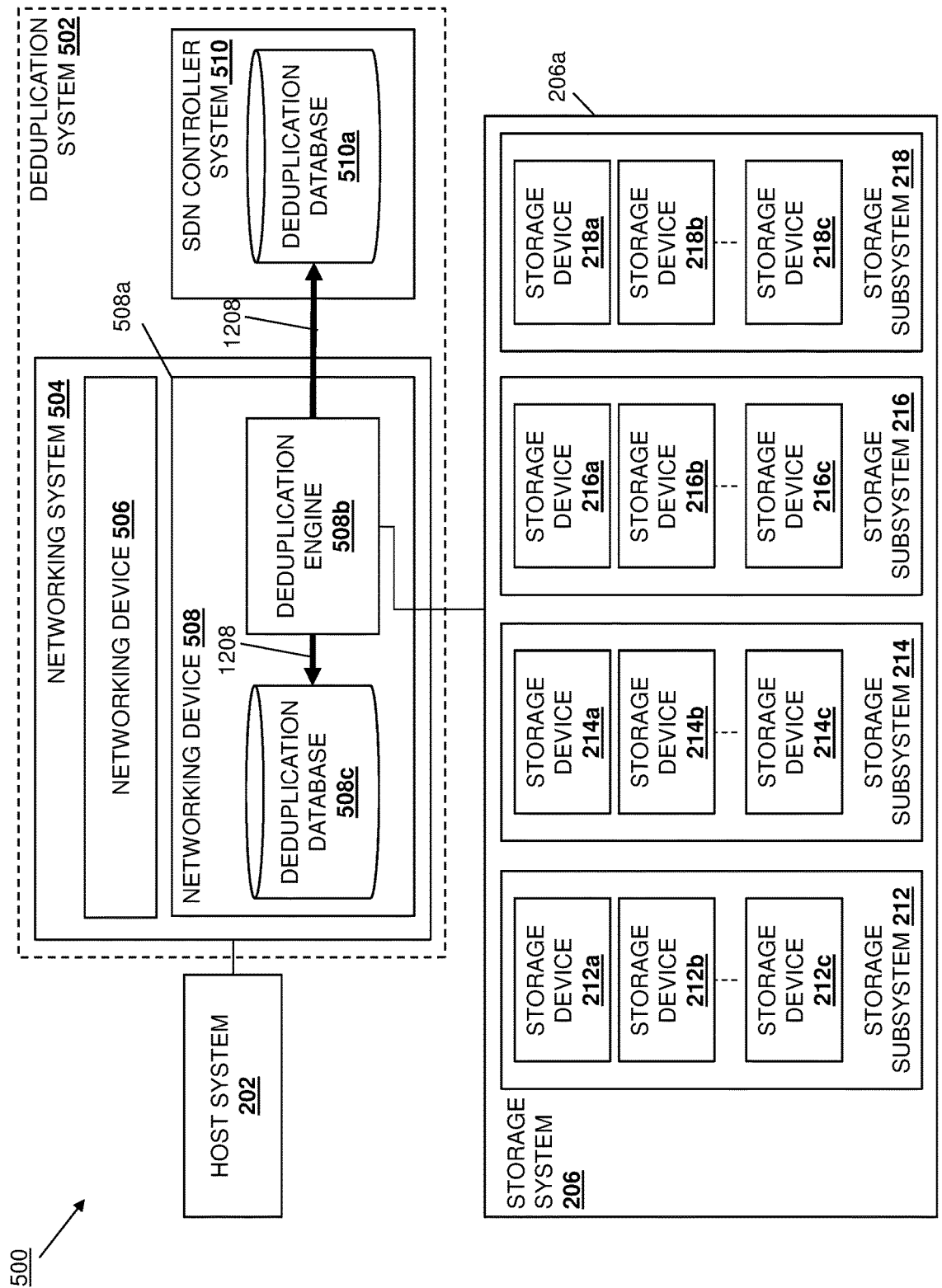
FIG. 12E is a schematic view illustrating an embodiment of the data deduplication system of FIG. 5 operating during the method of FIG. 7.

As discussed above, the deduplication engine 508b may periodically copy the data deduplication identifier/data counter tuples from the deduplication database 508c to the deduplication database 510a. For example, subsequent to performing the data deduplication identifier storage operations 1204 and data storage operations 1206 illustrated in FIGS. 12C and 12D, the deduplication engine 508b may synchronize the data deduplication identifier/data counter tuples in the deduplication database 508c with the deduplication database 510a. For example, with reference to FIG. 12E, the deduplication engine 508b may perform synchronization operations 1208 to synchronize the data deduplication identifier/data counter tuples in the deduplication database 508c with the deduplication database 510a. As such, in some embodiments the deduplication database 510a may store any data deduplication identifier/data counter tuples with non-zero data counters (discussed in further detail below), while the deduplication database 508c may store only a subset of data deduplication identifier/data counter tuples (e.g., for recently received data) with non-zero data counters, resulting in the performing of the first checking operations 1200 and the second checking operations 1202 in some embodiments of block 706.

Figure 13A:
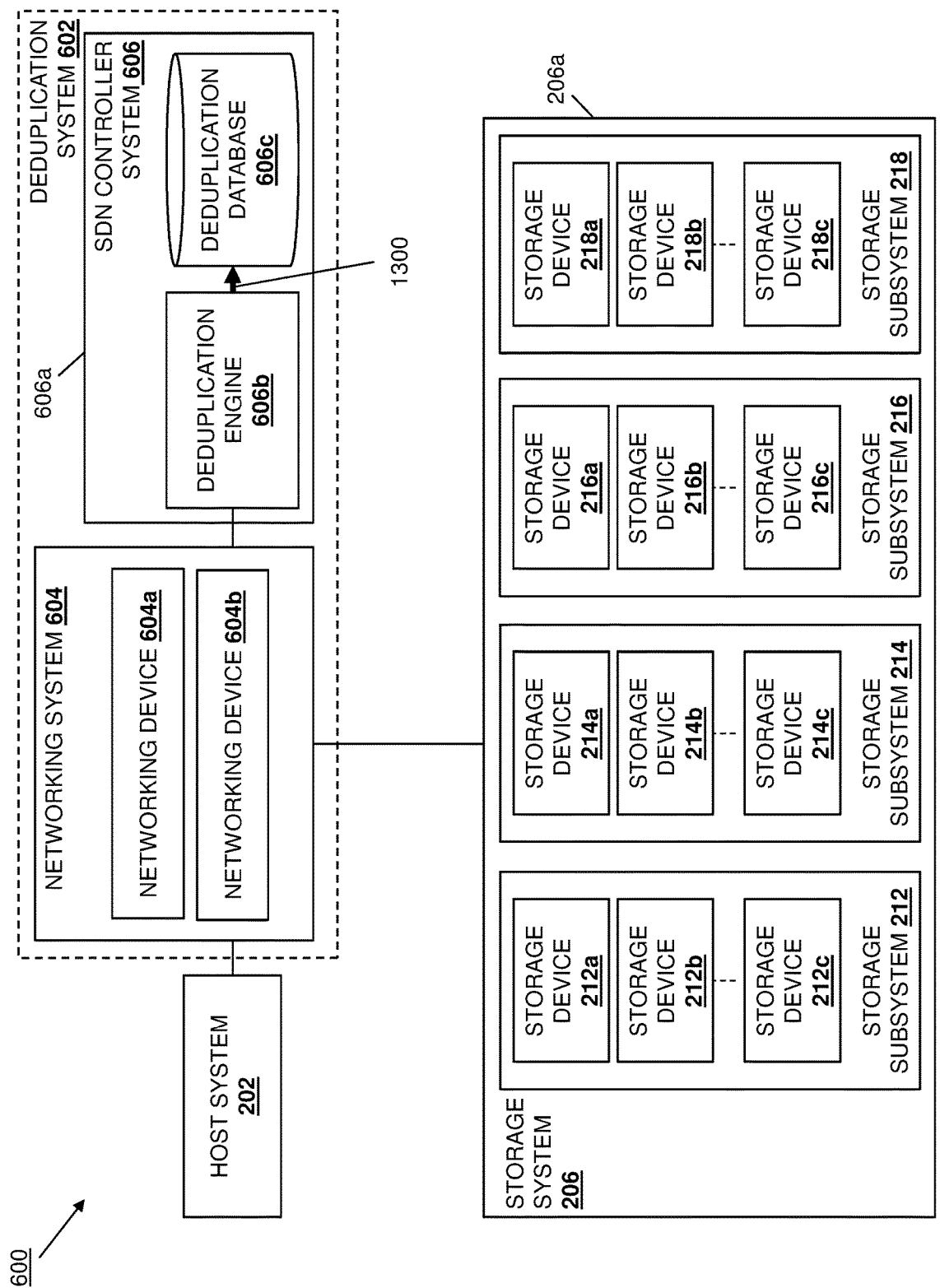
FIG. 13A is a schematic view illustrating an embodiment of the data deduplication system of FIG. 6 operating during the method of FIG. 7.

With reference to the data deduplication system 600, if at decision block 706 it is determined that the data deduplication identifier is not stored in the data deduplication database, the method 700 proceeds to block 708 where the data deduplication engine stores the data deduplication identifier in association with a data counter in the data deduplication database. With reference to FIG. 13A, in an embodiment of block 708 and following a determination at decision block 706 that a data deduplication identifier generated for a respective data chunk is not stored in the deduplication mapping table(s) 1100 in the deduplication databases 606c, the data deduplication engine 606b may perform data deduplication identifier storage operations 1300 to store the data deduplication identifier generated for that respective data chunk in the deduplication mapping table(s) 1100 in the deduplication database 606c. Furthermore, any data deduplication identifier stored in the deduplication mapping table(s) 1100 in the data deduplication database 606c may be stored as part of a data deduplication identifier/data counter tuple for its associated data that includes that data deduplication identifier for that data and a data counter for that data, discussed in further detail below. The method 700 then proceeds to block 710 where the data deduplication engine stores the data in a storage system.

Figure 13B:
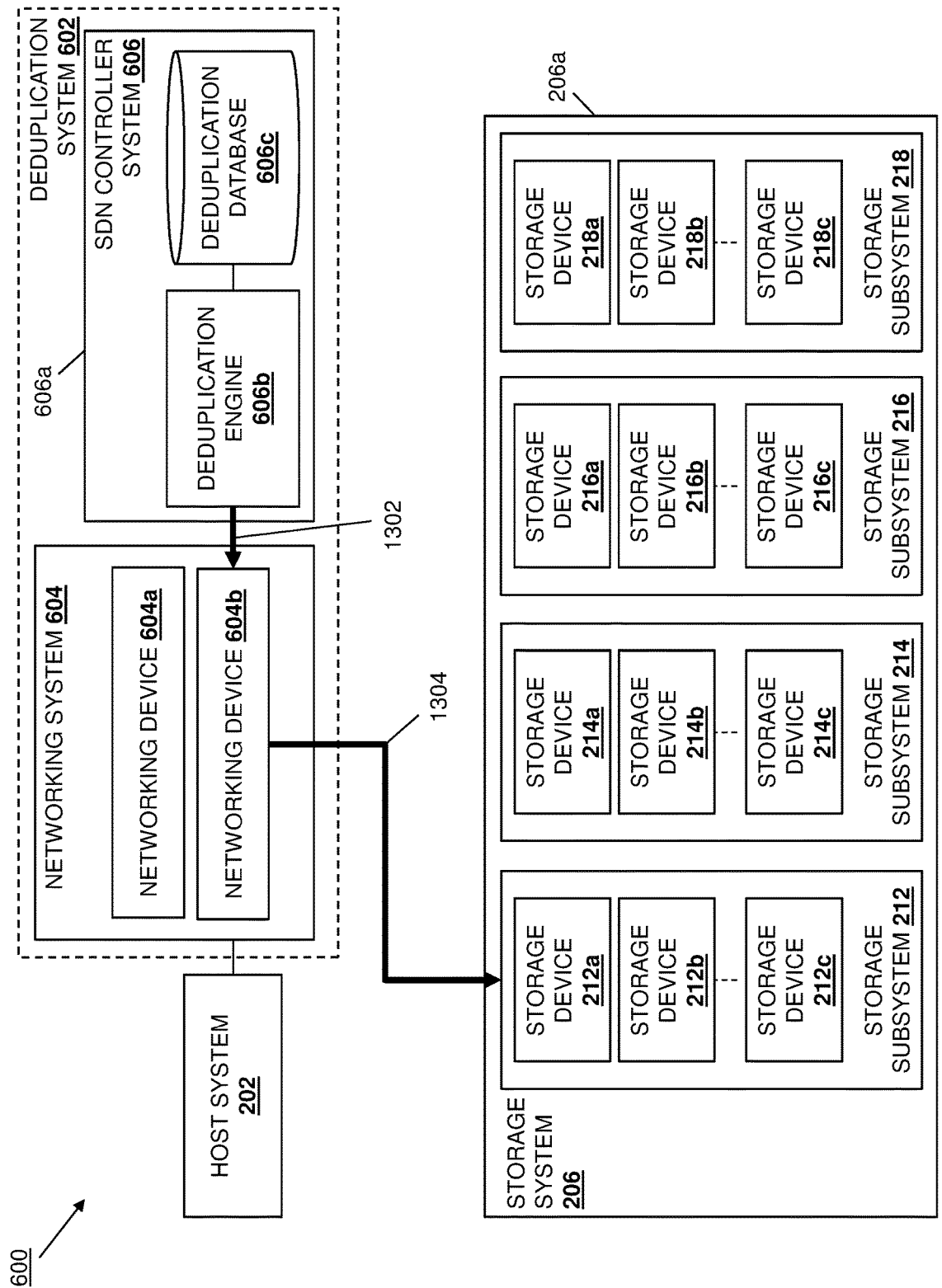
FIG. 13B is a schematic view illustrating an embodiment of the data deduplication system of FIG. 6 operating during the method of FIG. 7.

With reference to FIG. 13B, in an embodiment of block 710, the data deduplication engine 606b may then perform data storage operations 1302 to transmit the data 900/1002 that was received at block 702 in the networking device 604b, with the networking device 604b performing data storage operations 1304 to transmit that data 900/1002 for storage in a storage device in one of the storage subsystems 212-218 in the storage system 206. Similarly as discussed above, in some embodiments, the data stored in the storage system 206 may be stored in association with the data deduplication identifier for that data. For example, as discussed above, the host system 202 may operate to ensure that the first 128 bits of the data portion of a TCP/IP data packet which stores the data (e.g., in the data packet 1000 in FIG. 10) is empty (i.e., "NULL"), and at block 710 the data deduplication engine 606b may include the data deduplication identifier for that data in that 128 bits in the data portion of the data packet. As will be appreciated by one of skill in the art in possession of the present disclosure, the inclusion of the data deduplication identifier with the data that is stored in the storage system 206 may provide a variety of benefits. For example, in the event of a failure, loss, or other unavailability of the data deduplication database(s), the data deduplication identifiers included with the data stored in the storage system 206 may be utilized to rebuild the data deduplication database(s) (e.g., by retrieving those data deduplication identifiers included with the data stored in the storage system 206 and providing them in a new data deduplication database.)

Figure 12F:
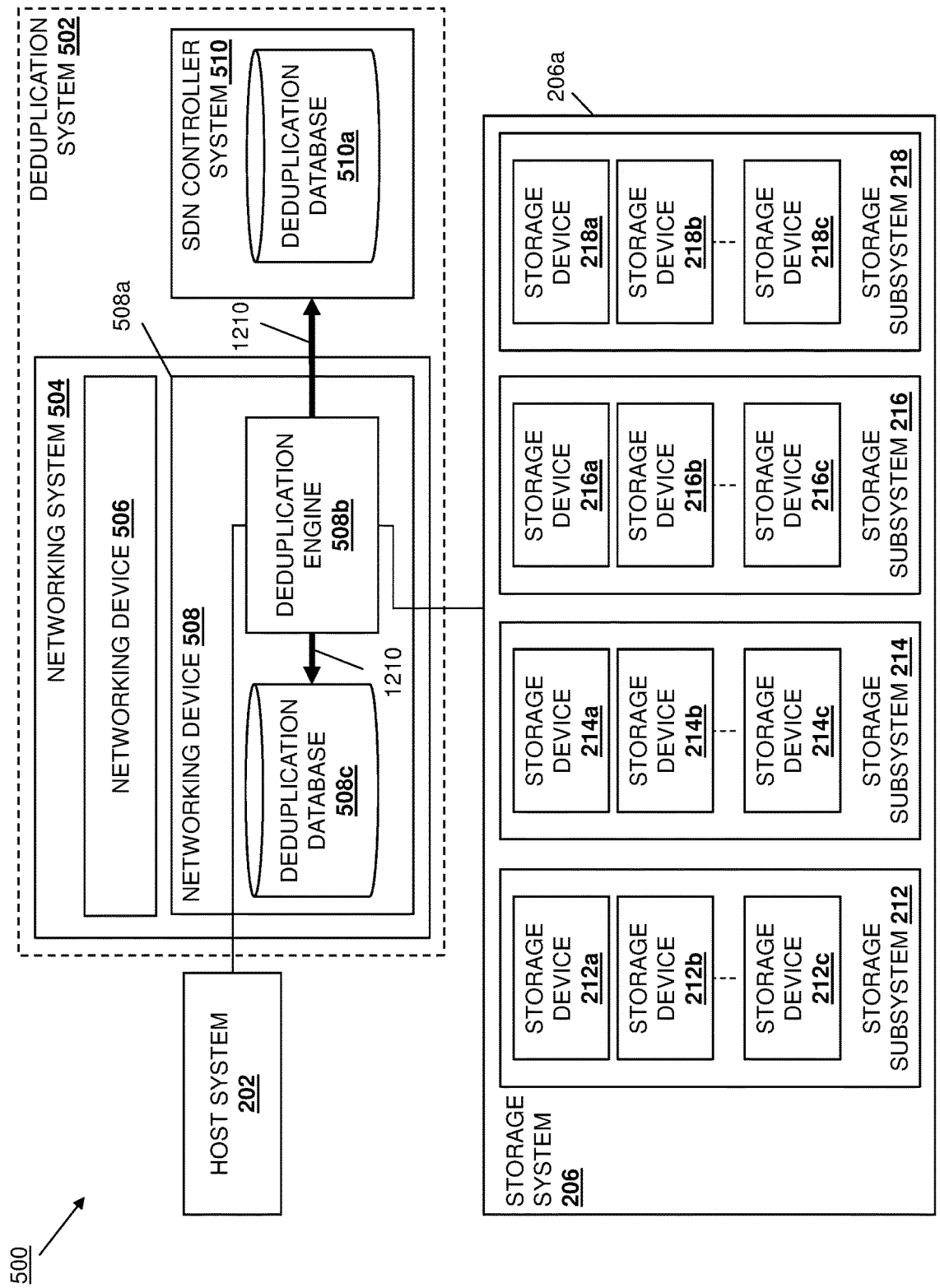
FIG. 12F is a schematic view illustrating an embodiment of the data deduplication system of FIG. 5 operating during the method of FIG. 7.

With reference to the data deduplication system 500, if at decision block 706, it is determined that the data deduplication identifier is not stored in the data deduplication database, the method 700 proceeds to block 712 where the data deduplication engine increments a data counter associated with the data deduplication identifier in the data deduplication database. With reference to FIG. 12F, in an embodiment of block 712 and following a determination at decision block 706 that a data deduplication identifier generated for a respective data chunk is stored in the deduplication mapping table(s) 1100 in the deduplication databases 508c or 510a, the data deduplication engine 508b may perform data counter incrementing operations 1210 to increment the data counter associated with that respective data chunk in the deduplication mapping table(s) 1100 in the deduplication databases 508c or 510a. As such, if the data deduplication identifier/data counter tuple for the data is stored in the deduplication database 508c, the data deduplication engine 508b will operate to increment that data counter. Furthermore, if the data deduplication identifier/data counter tuple for the data is stored in the deduplication database 510, the data deduplication engine 508b will transmit a data counter incrementing instruction to the SDN controller system 510, and the SDN controller system 210 will operate to increment that data counter.

Figure 13C:
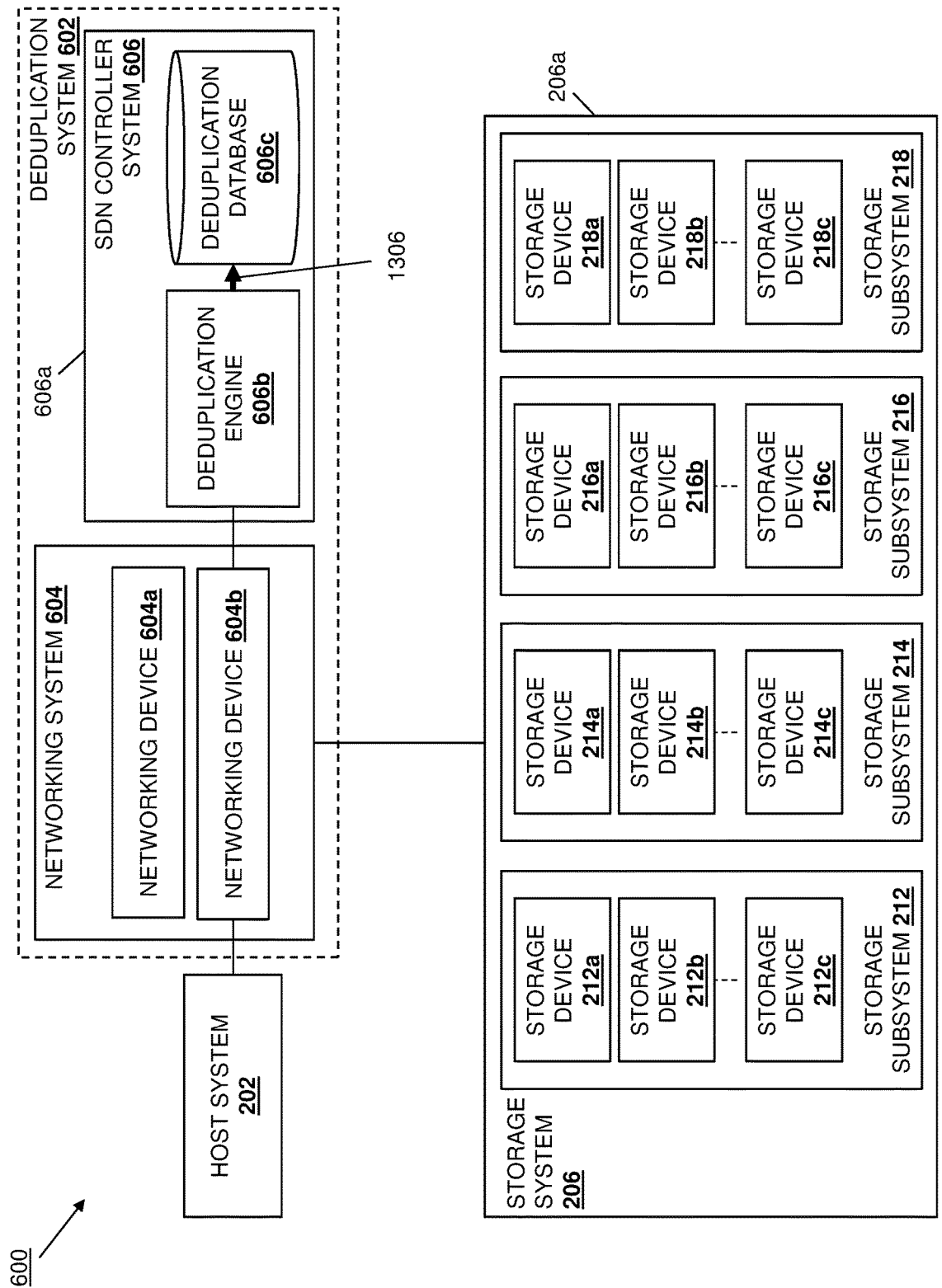
FIG. 13C is a schematic view illustrating an embodiment of the data deduplication system of FIG. 6 operating during the method of FIG. 7.

With reference to the data deduplication system 600, if at decision block 706, it is determined that the data deduplication identifier is not stored in the data deduplication database, the method 700 proceeds to block 712 where the data deduplication engine increments a data counter associated with the data deduplication identifier in the data deduplication database. With reference to FIG. 13C, in an embodiment of block 712 and following a determination at decision block 706 that a data deduplication identifier generated for a respective data chunk is stored in the deduplication mapping table(s) 1100 in the deduplication database

606c, the data deduplication engine 606b may perform data counter incrementing operations 1306 to increment the data counter associated with that respective data chunk in the deduplication mapping table(s) 1100 in the deduplication database 606c.

As discussed above, any data deduplication identifier stored in the deduplication mapping table(s) 1100 in the data deduplication databases 508c/510a or 606c may be stored as part of a data deduplication identifier/data counter tuple for its associated data that includes that data deduplication identifier for that data and a data counter for that data, and any time "duplicative" data is received, the data counter associated with that data may be incremented. As will be appreciated by one of skill in the art in possession of the present disclosure, the incrementing of the data counter for data that is already stored in the storage system 206 when "duplicative" data for that data is received provides a count of the number of host devices in the host system 202 that have provided that data for storage in the storage system 206, and thus the number of host devices in the host system 202 that may wish to retrieve that data. As such, as discussed further below, data may be kept stored in the storage system 206 as long as the data counter associated with that data is not at zero.

Figure 12G:
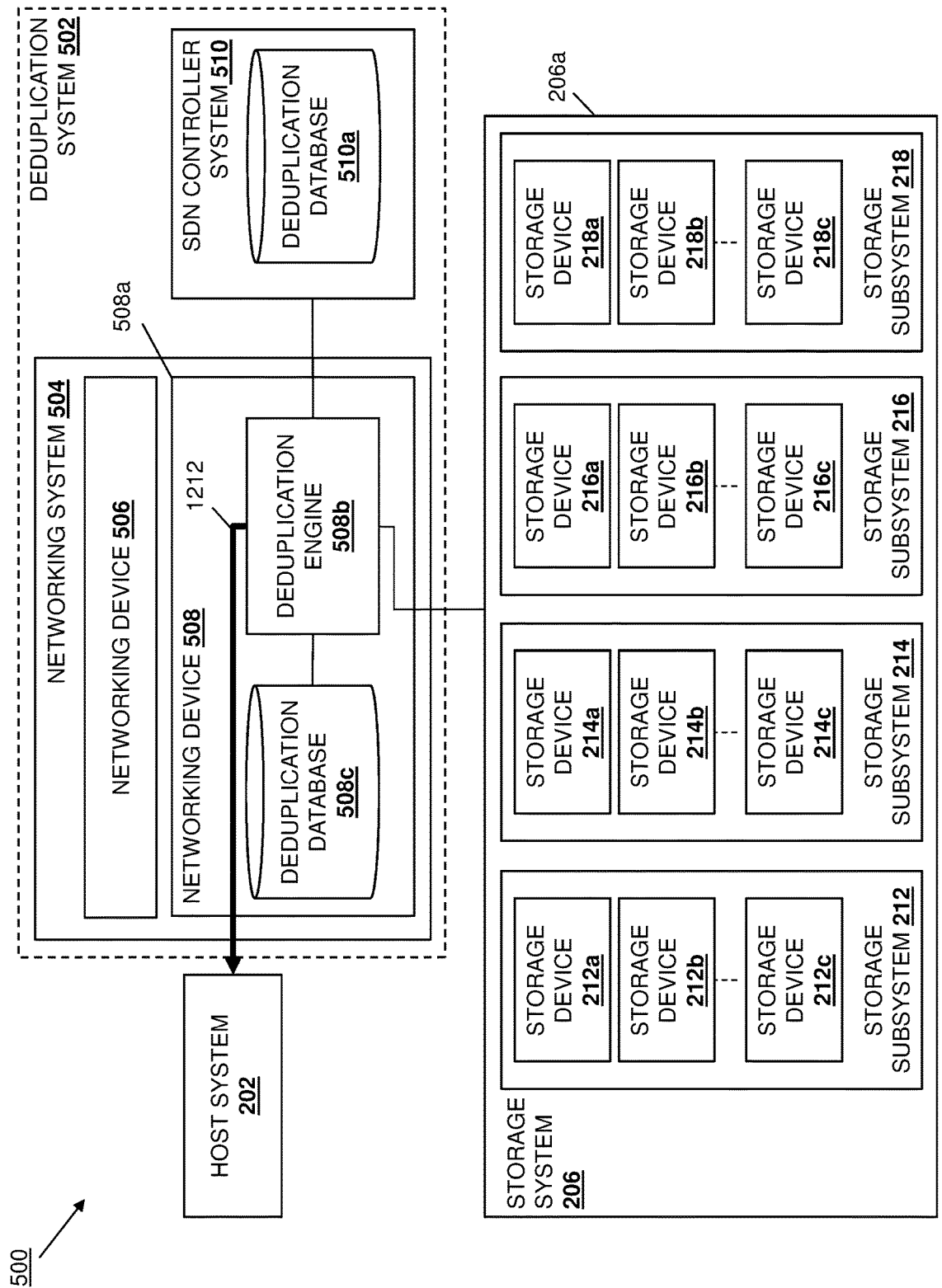
FIG. 12G is a schematic view illustrating an embodiment of the data deduplication system of FIG. 5 operating during the method of FIG. 7.
Figure 13D:
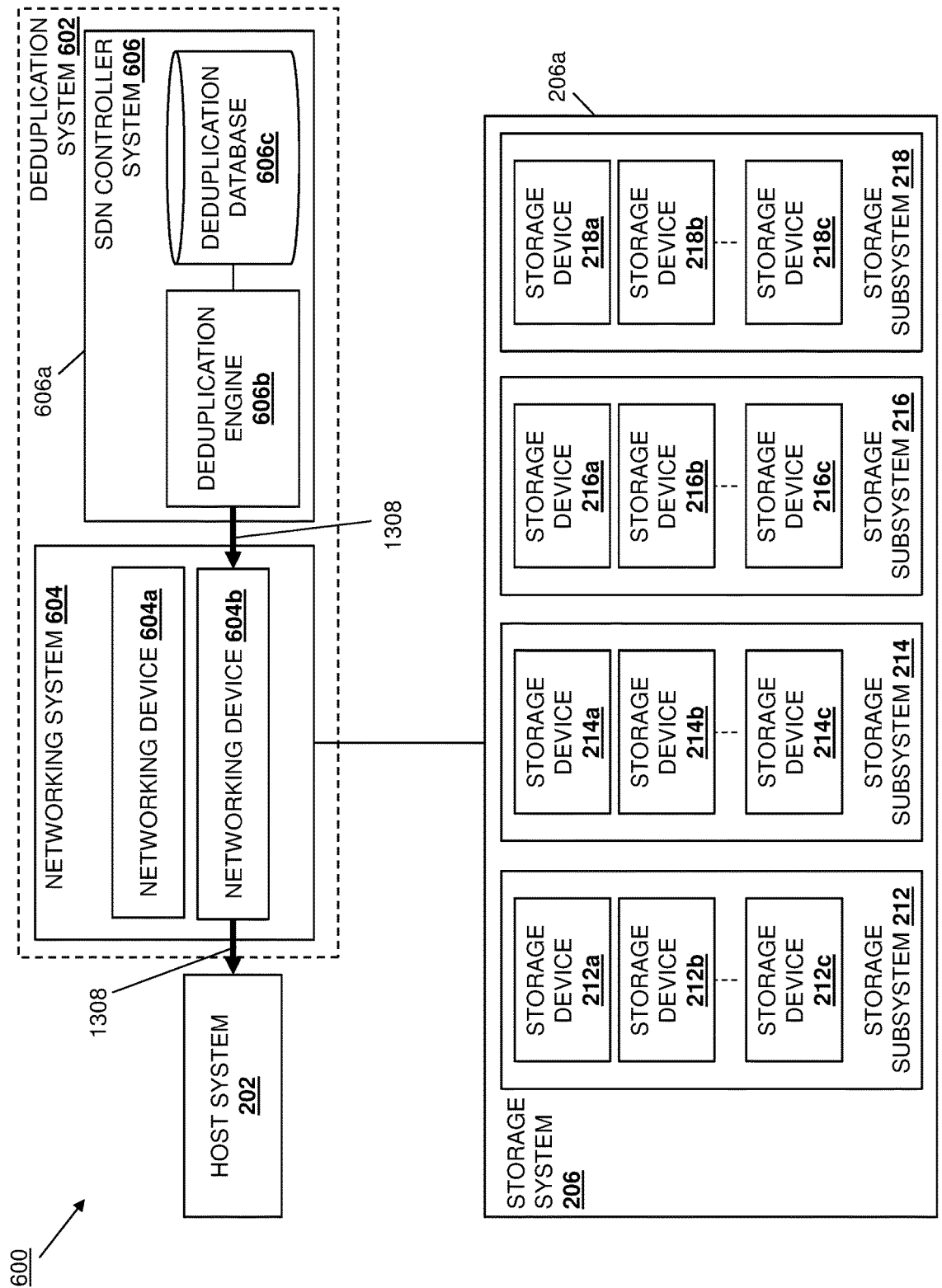
FIG. 13D is a schematic view illustrating an embodiment of the data deduplication system of FIG. 6 operating during the method of FIG. 7.

The method 700 then proceeds to block 714 where the data deduplication engine discards the data. With reference to the data deduplication system 500, in an embodiment of block 714, the data deduplication engine 508b may then discard the data 800/1100 (i.e., as the data deduplication engine 508b has determined that a copy of that data is already stored in the storage system 206.) Furthermore, with reference to FIG. 12G, following the storage of the data in the storage system 206 at block 710 or the discarding of the data at block 714, the data deduplication engine 508b may operate to generate and transmit an acknowledgement 1212 to the host system 202. As such, the application host or VM in the host system 202 may receive the acknowledgement 1212 that confirms that the data 800/1002 is stored in the storage system 206. With reference to the data deduplication system 600, in an embodiment of block 714, the data deduplication engine 606b may then discard the data 900/1100 (i.e., as the data deduplication engine 606b has determined that a copy of that data is already stored in the storage system 206.) Furthermore, with reference to FIG. 13D, following the storage of the data in the storage system 206 at block 710 or the discarding of the data at block 714, the data deduplication engine 606b may operate to generate and transmit an acknowledgement 1308 to the networking device 604b, which forwards that acknowledgement 1308 to the host system 202. As such, the application host or VM in the host system 202 may receive the acknowledgement 1306 that confirms that the data 900/1002 is stored in the storage system 206. Following either of block 710 or block 714, the method 700 may return to block 702 and loop back through the block 702, 704, 706, 708, 710, 712, and 714 to receive data, generate a data deduplication identifier for that data, determine whether that data deduplication identifier is stored in a data deduplication database, store the data in a storage system and the data deduplication identifier in association with a data counter in the data deduplication database if so, and discard the data and increment the data counter associated with the data deduplication identifier in the data deduplication database if not.

Figure 7B:
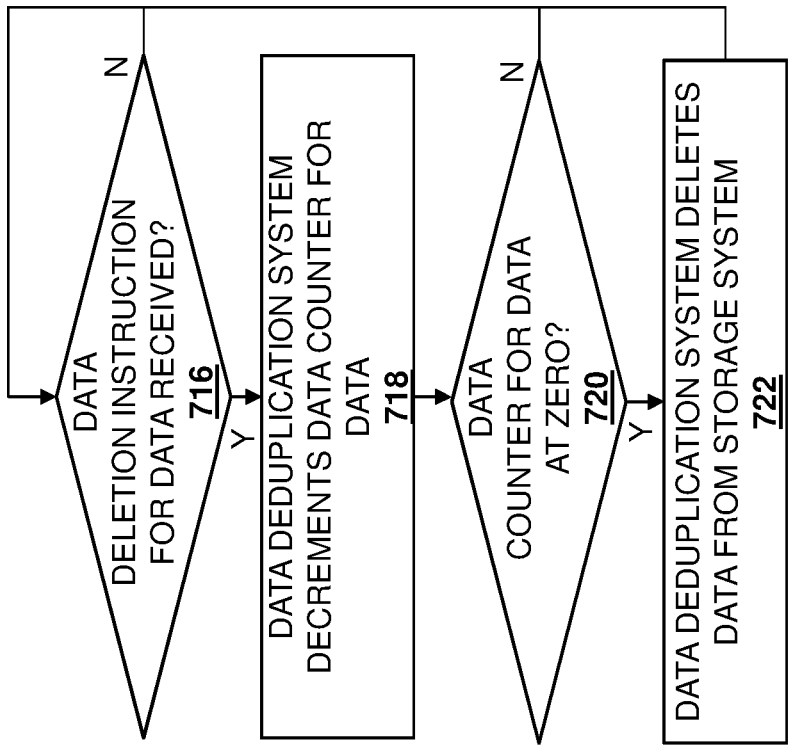
FIG. 7B is a flow chart illustrating an embodiment of a method for performing data deduplication operations using the data deduplication system of FIG. 5 or 6.

Furthermore, in addition to the method 700, a data deletion method 715 may be performed by the data deduplication system 500 or 600 as well. For example, with reference to FIG. 7B, the method 715 may begin at decision block 716 where it is determined whether a data deletion instruction for the data has been received. In an embodiment, at decision block 716, the data deduplication engine 508b or 606b may determine whether a deletion instruction is received from the host system 202 (e.g., from any host device, application host, or VM that previously provided data that was stored in the storage system 206 as described above, or that previously provided "duplicative" data that was handled by the data deduplication engine 508b or 606b as described above.) If, at decision block 716, it is determined that the data deletion instruction for the data has not been received, the method 700 returns to block 702. As such, the method 715 may loop to determine whether a deletion instruction for data that is stored in the storage system is received, with the method 700 operating as discussed above to store "new" data the storage system along with the data deduplication identifier/data counter tuple for that data in the data deduplication database 508c/510a or 606d, and increment the data counter for "duplicative" data while discarding that "duplicative" data, as long as no deletion instruction for that data is received.

If, at decision block 716, it is determined that the data deletion instruction for the data has been received, the method 700 proceeds to block 718 where the data deduplication engine decrements the data counter for the data. With reference to the data deduplication system 500, in an embodiment of block 718 and in response to determining that a deletion instruction is received from the host system 202 (e.g., from any host device, application host, or VM that previously provided data that was stored in the storage system 206 as described above, or provided "duplicative" data that was handled by the data deduplication engine 206 as described above), the data deduplication engine 508b may operate to decrement the data counter that is associated with the data deduplication identifier for that data in the data deduplication database 508c/510a. As such, if the data deduplication identifier/data counter tuple of that data is stored in the data deduplication database 508c, the data deduplication engine 508b may operate to decrement the data counter that is associated with the data deduplication identifier for that data in the data deduplication database 508c. However, if the data deduplication identifier/data counter tuple of that data is stored in the data deduplication database 510a, the data deduplication engine 508b may send a decrementing instruction to the SDN controller system 510, and the SDN controller system 510 may operate to decrement the data counter that is associated with the data deduplication identifier for that data in the data deduplication database 510a. With reference to the data deduplication system 600, in an embodiment of block 718 and in response to determining that a deletion instruction is received from the host system 202 (e.g., from any host device, application host, or VM that previously provided data that was stored in the storage system 206 as described above, or provided "duplicative" data that was handled by the data deduplication engine as described above), the data deduplication engine 606b may operate to decrement the data counter that is associated with the data deduplication identifier for that data in the data deduplication database 606c.

The method 700 then proceeds to decision block 720 where it is determined whether the data counter for the data is at zero. In an embodiment, at decision block 720 and following the decrementing of the data counter that is associated with the data deduplication identifier for data in the data deduplication database 508c/510a or 606c, the data deduplication engine 508b or 606b will determine whether that data counter is at zero. If, at decision block 720, it is determined that the data counter for the data is not at zero, the method 700 returns to block 702. As such, the method 715 may loop to decrement the data counter in response to data deletion instructions for data in the storage system as long as the data counter for that data is not at zero, with the method 700 operating as discussed above to store "new" data the storage system along with the data deduplication identifier/data counter tuple for that data in the data deduplication database 508c/510a or 606c, and increment the data counter for "duplicative" data while discarding that "duplicative" data.

If, at decision block 720, it is determined that the data counter for the data is at zero, the method 700 proceeds to block 722 where the data deduplication engine deletes the data from the storage system. In an embodiment, at block 722 and in response to determining that the data counter for data is at zero following the decrementing of that data counter in response to a deletion instruction for that data, the data deduplication engine 508b or 606b may cause that data to be deleted from the storage device in the storage subsystem upon which it is stored. The method 700 then returns to block 702. As such, the method 715 may loop to decrement the data counter in response to data deletion instructions for data in the storage system as long as the data counter for that data is not at zero, and delete that data from the storage system in the event the data counter for that data is at zero following its decrementing, with the method 700 operating as discussed above to store "new" data the storage system along with the data deduplication identifier/data counter tuple for that data in the data deduplication database 508c/ 510a or 606c, and increment the data counter for "duplicative" data while discarding that "duplicative" data. As discussed above, a data counter for data that is at zero indicates that the last host device/application host/VM that previously provided that data for storage in the storage system has requested its deletion, and thus that there is no need to continue to store that data in the storage system 206.

Thus, systems and methods have been described that provided a "inline" data deduplication system in a networking device and SDN controller system that are coupled between a host system that generates and transmits data, and a storage system that stores that data. The data deduplication system receives data from the host system generates a data deduplication identifier for the data, and determines whether the data deduplication identifier for the data is stored in a data deduplication database. In response to determining that the data deduplication identifier for the data is not stored in the data deduplication database, the data deduplication system stores the data deduplication identifier for the data in the data deduplication database in association with a data counter for the data, and transmits the data to the storage system for storage. In response to determining that the data deduplication identifier for the data is stored in the data deduplication database, the data deduplication system increments a data counter that is associated with the data deduplication identifier for the data in the data deduplication database, and discards the data. Thus, data deduplication operations are moved to the networking level between the host system that generates data and the storage system that stores the data, thus offloading the data deduplication processing overhead from the host system, while conserving bandwidth on the network path to the storage system.

As will be appreciated by one of skill in the art in possession of the present disclosure, in a specific example, the performance of deduplication operations in a TOR switch device or SDN controller systems coupled to that TOR switch device ensures that only unique data is written to the storage system, resulting in less network traffic between the TOR switch device and the storage system, and associated storage system performance improvements. The use of a TOR switch device and SDN controller system as described above introduces a unique and consistent technique to perform deduplication operations irrespective of the type of application host, VM, or workload provided by the host system. Furthermore, the deduplication operations proposed herein need not be application-aware and/or provided by managed source-based deduplication systems, data-protection-aware and/or provided by managed target-based deduplication systems, or SDS-aware and/or provided by post-processing based systems. Rather, deduplication operations according to the teachings of the present disclosure may be performed at the networking/switch level and consistently across all infrastructure, which allows a mix of traditional storage and SDS/HCl storage running virtualized infrastructure and/or any applications/workloads.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data deduplication system, comprising:
a host system that is provided in a host system chassis;
a storage system that is provided in a storage system chassis that is separate from the host system chassis;
a Software Defined Networking (SDN) controller system that includes a first portion of a data deduplication database; and
a first network switch device that is provided in a first network switch device chassis that is separate from the host system chassis and the storage system chassis, and that is coupled to each of the host system, the storage system, and the SDN controller system via a first network switch device, wherein the first network switch device includes a second portion of the data deduplication database and provides a first data deduplication subsystem that is configured to:
receive, via a network using the first network switch device, first data transmitted by the host system through the network for storage in the storage system;
generate a first data deduplication identifier for the first data;
determine whether the first data deduplication identifier for the first data is stored in either of the first portion of the data deduplication database or the second portion of the data deduplication database;
in response to determining that the first data deduplication identifier for the first data is not stored in either of the first portion of the data deduplication database or the second portion of the data deduplication database:
store the first data deduplication identifier for the first data in the second portion of the data deduplication database in association with a first data counter for the first data; and
transmit, through the network using the first network switch device, the first data to the storage system for storage; and
in response to determining that the first data deduplication identifier for the first data is stored in one of the first portion of the data deduplication database and the second portion of the data deduplication database:
　　increment a first data counter that is associated with the first data deduplication identifier for the first data in the one of the first portion of the data deduplication database and the second portion of the data deduplication database; and
　　discard the first data.

2. The system of claim 1, further comprising:
a second network switch device that is provided in a second network switch device chassis that is separate from the host system chassis and the storage system chassis, and that is coupled to each of the host system, the storage system, and the SDN controller system via a second network switch device, wherein the second network switch device includes a third portion of the data deduplication database and provides a second data deduplication subsystem that is configured to:
　　receive, via the network using the second network switch device, second data transmitted by the host system through the network for storage in the storage system;
　　generate a second data deduplication identifier for the second data;
　　determine whether the second data deduplication identifier for the second data is stored in either of the first portion of the data deduplication database or the third portion of the data deduplication database;
　　in response to determining that the second data deduplication identifier for the second data is not stored in either of the first portion of the data deduplication database or the third portion of the data deduplication database:
　　　　store the second data deduplication identifier for the second data in the third portion of the data deduplication database in association with a second data counter for the second data; and
　　　　transmit, through the network using the second network switch device, the second data to the storage system for storage; and
　　in response to determining that the second data deduplication identifier for the second data is stored in one of the first portion of the data deduplication database and the third portion of the data deduplication database:
　　　　increment a second data counter that is associated with the second data deduplication identifier for the second data in the one of the first portion of the data deduplication database and the third portion of the data deduplication database; and
　　　　discard the second data.

3. The system of claim 2, wherein the second data deduplication system is configured to:
　　transfer the second data deduplication identifier for the second data and the second data counter for the second data from the third portion of the data deduplication database to the first portion of the data deduplication database.

4. The system of claim 1, wherein the SDN controller system is provided in a SDN controller system chassis that is separate from the host system chassis, the storage system chassis, and the first network switch device chassis.

5. The system of claim 1, wherein the first data deduplication subsystem is configured to:
　　transfer the first data deduplication identifier for the first data and the first data counter for the first data from the second portion of the data deduplication database to the first portion of the data deduplication database.

6. The system of claim 1, wherein the first data deduplication subsystem is configured to:
　　receive a data delete instruction from the host system that identifies the first data for deletion;
　　decrement the first data counter that is associated with the first data deduplication identifier for the first data in the one of the first portion of the data deduplication database and the second portion of the data deduplication database;
　　determine whether the first data counter that is associated with the first data deduplication identifier for the first data in the one of the first portion of the data deduplication database and the second portion of the data deduplication database is at zero; and
　　cause, in response to determining that the first data counter that is associated with the first data deduplication identifier for the first data in the one of the first portion of the data deduplication database and the second portion of the data deduplication database is at zero, the first data to be deleted from the storage system.

7. An Information Handling System (IHS), comprising:
at least one first Information Handling System (IHS) chassis;
a first processing system that is housed in the at least one first IHS chassis; and
a first memory system that is housed in the at least one first IHS chassis, coupled to the first processing system, and that includes instructions that, when executed by the first processing system, cause the first processing system to provide a first data deduplication engine that is configured to:
　　receive, via a network using a first network switch device and from a host system that is provided in a host system chassis that is separate from the at least one first IHS chassis, first data transmitted by the host system through the network for storage in a storage system that is provided in a storage system chassis that is separate from the at least one first IHS chassis and the host system chassis;
　　generate a first data deduplication identifier for the first data;
　　determine whether the first data deduplication identifier for the first data is stored in either of a first portion of a data deduplication database that is included in a Software Defined Networking (SDN) controller system or a second portion of the data deduplication database that is included in the first network switch device;
　　in response to determining that the first data deduplication identifier for the first data is not stored in one of the first portion of the data deduplication database and the second portion of the data deduplication database:
　　　　store the first data deduplication identifier for the first data in one of the first portion of the data deduplication database and the second portion of the data deduplication database in association with a first data counter for the first data; and
　　　　transmit, through the network using the first network switch device, the first data to the storage system for storage; and
　　in response to determining that the first data deduplication identifier for the first data is stored in one of the first portion of the data deduplication database
and the second portion of the data deduplication
database:
increment a first data counter that is associated with
the first data deduplication identifier for the first
data in the one of the first portion of the data
deduplication database and the second portion of
the data deduplication database; and
discard the first data.

8. The IHS of claim 7, further comprising:
at least one second Information Handling System (IHS)
chassis;
a second processing system that is housed in the at least
one second IHS chassis; and
a second memory system that is housed in the at least one
second IHS chassis, coupled to the second processing
system, and that includes instructions that, when
executed by the second processing system, cause the
second processing system to provide a second data
deduplication engine that is configured to:
receive, via the network using a second network switch
device and from the host system, second data transmitted by the host system through the network for
storage in the storage system;
generate a second data deduplication identifier for the
second data;
determine whether the second data deduplication identifier for the second data is stored in either of the first
portion of the data deduplication database or a third
portion of the data deduplication database that is
included in the second network switch device;
in response to determining that the second data deduplication identifier for the second data is not stored in
one of the first portion of the data deduplication
database and the third portion of the data deduplication database:
store the second data deduplication identifier for the
second data in one of the first portion of the data
deduplication database and the third portion of the
data deduplication database in association with a
second data counter for the second data; and
transmit, through the network using the second network switch device, the second data to the storage
system for storage; and
in response to determining that the second data deduplication identifier for the second data is stored in
one of the first portion of the data deduplication
database and the third portion of the data deduplication database:
increment a second data counter that is associated
with the second data deduplication identifier for
the second data in the one of the first portion of the
data deduplication database and the third portion
of the data deduplication database; and
discard the second data.

9. The IHS of claim 8, wherein the second data deduplication engine is configured to:
transfer the second data deduplication identifier for the
second data and the second data counter for the second
data from the third portion of the data deduplication
database to the first portion of the data deduplication
database.

10. The IHS of claim 7, wherein the SDN controller system is provided in a SDN controller system chassis that is separate from the host system chassis, the storage system chassis, and the first IHS chassis.

11. The IHS of claim 7, wherein the first data deduplication engine is configured to:
transfer the first data deduplication identifier for the first
data and the first data counter for the first data from the
second portion of the data deduplication database to the
first portion of the data deduplication database.

12. The IHS of claim 7, wherein the first data deduplication engine is configured to:
receive a data delete instruction from the host system that
identifies the first data for deletion;
decrement the first data counter that is associated with the
first data deduplication identifier for the first data in the
one of the first portion of the data deduplication database and the second portion of the data deduplication
database;
determine that the first data counter that is associated with
the first data deduplication identifier for the first data in
the one of the first portion of the data deduplication
database and the second portion of the data deduplication database is at zero; and
cause, in response to determining that the first data
counter that is associated with the first data deduplication identifier for the first data in the one of the first
portion of the data deduplication database and the
second portion of the data deduplication database is at
zero, the first data to be deleted from the storage
system.

13. The IHS of claim 7, wherein the first data deduplication engine is configured to:
receive a data delete instruction from the host system that
identifies the first data for deletion;
decrement the first data counter that is associated with the
first data deduplication identifier for the first data in the
one of the first portion of the data deduplication database and the second portion of the data deduplication
database;
determine that the first data counter that is associated with
the first data deduplication identifier for the first data in
the one of the first portion of the data deduplication
database and the second portion of the data deduplication database is not at zero; and
maintain the first data in the storage system.

14. A method for performing data deduplication, comprising:
receiving, by a first data deduplication system that is
provided in at least one first data deduplication system
chassis from a host system that is provided in a host
system chassis that is separate from the at least one first
data deduplication system chassis and via a network
using a first network switch device, first data transmitted by the host system through the network for storage
in a storage system that is provided in a storage system
chassis that is separate from the at least one first data
deduplication system chassis and the host system chassis;
generating, by the first data deduplication system, a first
data deduplication identifier for the first data;
determining, by the first data deduplication system,
whether the first data deduplication identifier for the
first data is stored in either of a first portion of a data
deduplication database that is included in a Software
Defined Networking (SDN) controller system or a
second portion of the data deduplication database that
is included in the first network switch device;
in response to determining that the first data deduplication
identifier for the first data is not stored in one of the first portion of the data deduplication database and the second portion of the data deduplication database:
  storing, by the first data deduplication system, the first data deduplication identifier for the first data in the one of the first portion of the data deduplication database and the second portion of the data deduplication database in association with a first data counter for the first data; and
  transmitting, by the first data deduplication system through the network using the first network switch device, the first data via the network to the storage system for storage; and
in response to determining that the first data deduplication identifier for the first data is stored in the one of the first portion of the data deduplication database and the second portion of the data deduplication database:
  incrementing, by the first data deduplication system, a first data counter that is associated with the first data deduplication identifier for the first data in the one of the first portion of the data deduplication database and the second portion of the data deduplication database; and
  discarding, by the first data deduplication system, the first data.

15. The method of claim 14, further comprising:
receiving, by a second data deduplication system that is provided in at least one second data deduplication system chassis that is separate from the host system chassis and via the network using a second network switch device, second data transmitted by the host system through the network for storage in the storage system that is provided in the storage system chassis that is separate from the at least one second data deduplication system chassis;
generating, by the second data deduplication system, a second data deduplication identifier for the second data;
determining, by the second data deduplication system, whether the second data deduplication identifier for the second data is stored in either of the first portion of the data deduplication database or a third portion of the data deduplication database that is included in the second network switch device;
in response to determining that the second data deduplication identifier for the second data is not stored in one of the first portion of the data deduplication database and the third portion of the data deduplication database:
  storing, by the second data deduplication system, the second data deduplication identifier for the second data in the one of the first portion of the data deduplication database and the third portion of the data deduplication database in association with a second data counter for the second data; and
  transmitting, by the second data deduplication system through the network using the second network switch device, the second data via the network to the storage system for storage; and
in response to determining that the second data deduplication identifier for the second data is stored in the one of the first portion of the data deduplication database and the third portion of the data deduplication database:
  incrementing, by the second data deduplication system, a second data counter that is associated with the second data deduplication identifier for the second data in the one of the first portion of the data deduplication database and the third portion of the data deduplication database; and
  discarding, by the second data deduplication system, the second data.

16. The method of claim 15, further comprising:
transferring, by the second data deduplication system, the second data deduplication identifier for the second data and the second data counter for the second data from the third portion of the data deduplication database to the first portion of the data deduplication database.

17. The method of claim 14, wherein the SDN controller system is provided in a SDN controller system chassis that is separate from the host system chassis, the storage system chassis, and the first data deduplication system chassis.

18. The method of claim 14, further comprising:
transferring, by the first data deduplication system, the first data deduplication identifier for the first data and the first data counter for the first data from the second portion of the data deduplication database to the first portion of the data deduplication database.

19. The method of claim 14, further comprising:
receiving, by the first data deduplication system, a data delete instruction from the host system that identifies the first data for deletion;
decrementing, by the first data deduplication system, the first data counter that is associated with the first data deduplication identifier for the first data in the one of the first portion of the data deduplication database and the second portion of the data deduplication database;
determining, by the first data deduplication system, that the first data counter that is associated with the first data deduplication identifier for the first data in the one of the first portion of the data deduplication database and the second portion of the data deduplication database is at zero; and
causing, by the first data deduplication system in response to determining that the first data counter that is associated with the first data deduplication identifier for the first data in the one of the first portion of the data deduplication database and the second portion of the data deduplication database is at zero, the first data to be deleted from the storage system.

20. The method of claim 14, further comprising:
receiving, by the first data deduplication system, a data delete instruction from the host system that identifies the first data for deletion;
decrementing, by the first data deduplication system, the first data counter that is associated with the first data deduplication identifier for the first data in the one of the first portion of the data deduplication database and the second portion of the data deduplication database;
determining, by the first data deduplication system, that the first data counter that is associated with the first data deduplication identifier for the first data in the one of the first portion of the data deduplication database and the second portion of the data deduplication database is not at zero; and
maintaining, by the first data deduplication system, the first data in the storage system.

* * * * *